(12) United States Patent
Nishida

(10) Patent No.: US 9,176,682 B2
(45) Date of Patent: Nov. 3, 2015

(54) JOB PERFORMING CONTROL SYSTEM, JOB PERFORMING SYSTEM AND JOB PERFORMING CONTROL METHOD

(71) Applicant: Noriko Nishida, Tokyo (JP)

(72) Inventor: Noriko Nishida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/182,367

(22) Filed: Feb. 18, 2014

(65) Prior Publication Data
US 2014/0240765 A1   Aug. 28, 2014

(30) Foreign Application Priority Data

Feb. 28, 2013   (JP) .................................. 2013-038764

(51) Int. Cl.
*G06F 3/12* (2006.01)
*G06F 15/00* (2006.01)
*G06K 1/00* (2006.01)

(52) U.S. Cl.
CPC ............ *G06F 3/1204* (2013.01); *G06F 3/1238* (2013.01); *G06F 3/1267* (2013.01); *G06F 3/1287* (2013.01); *G06F 3/1288* (2013.01); *G06F 3/1213* (2013.01); *G06F 3/1222* (2013.01)

(58) Field of Classification Search
CPC .......... H04N 1/00209; H04N 1/00212; H04N 1/00222; H04N 2201/0075; G06K 15/4095; G06F 3/1204; G06F 3/1238; G06F 3/1267; G06F 3/1287; G06F 3/1288; G06F 3/1213; G06F 3/1222
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS 8,582,142 B2 * 11/2013 Takahashi et al. ............ 358/1.15
2011/0235120 A1 * 9/2011 Kinoshita et al. ............ 358/1.15

FOREIGN PATENT DOCUMENTS

JP          4042321       2/2008
JP          2011-056918   3/2011

* cited by examiner

*Primary Examiner* — Thierry L Pham
(74) *Attorney, Agent, or Firm* — IPUSA, PLLC

(57) ABSTRACT

A job performing control system that includes at least an apparatus and controls a job performing apparatus that performs a job, includes a job storing unit that stores a job input in the job performing control system with attribute data of the job, the attribute data being set based on an inputting method of the job; a rule storing unit that stores a predetermined rule that determines a method of performing the job in the job performing apparatus; a determining unit that determines whether the attribute data of the job satisfies the predetermined rule; and a performing control unit that controls the job performing apparatus to perform the job determined to satisfy the predetermined rule by the determining unit by the method of performing the job determined from the predetermined rule.

17 Claims, 21 Drawing Sheets

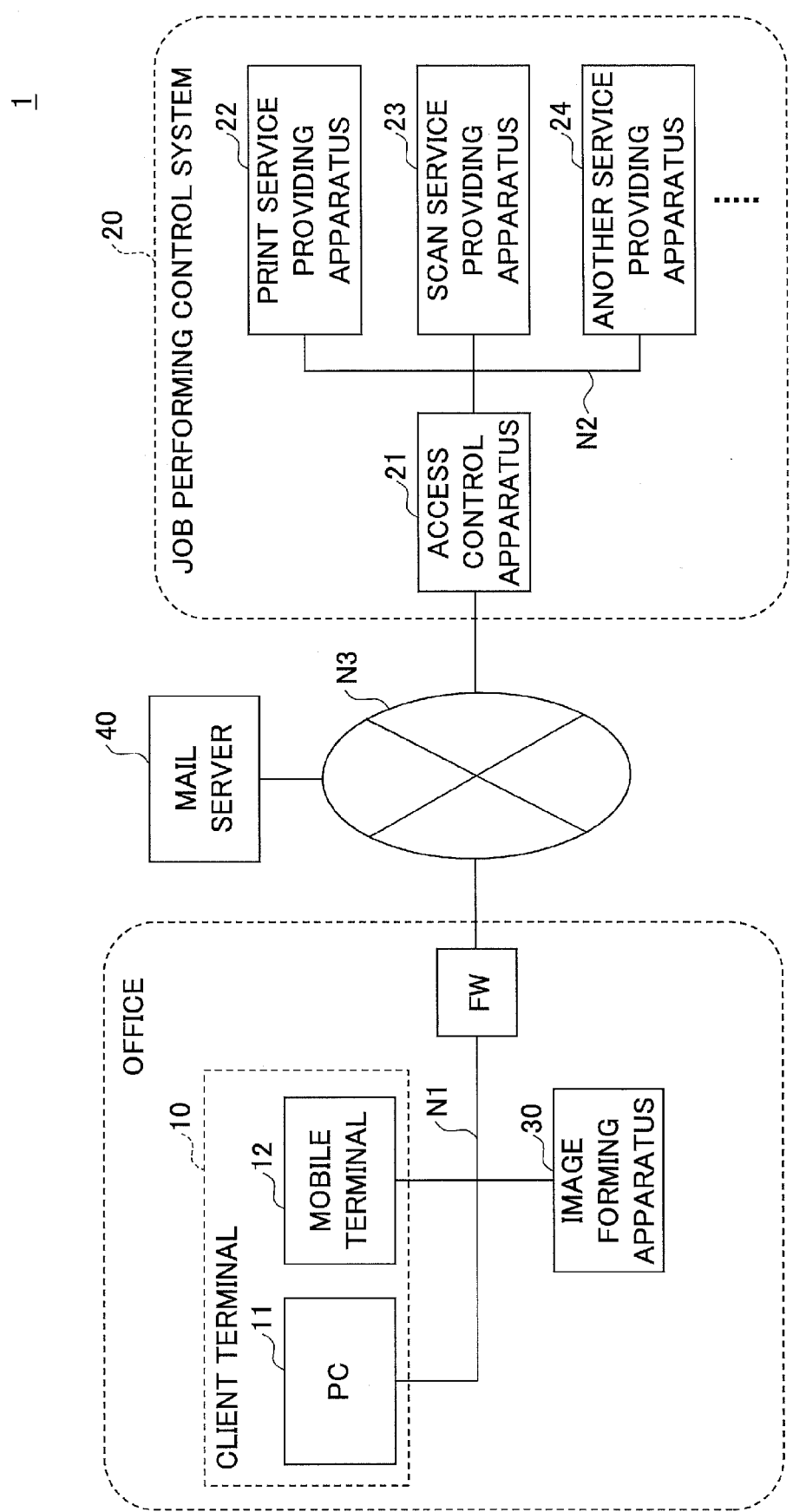

FIG.9

| JOB ID | COMPANY CODE | USER ID | JOB NAME | PRINT SETTING | JOB INPUTTING METHOD | E-MAIL DESTINATION DEVICE /OFFICE DATA | DIRECT PRINT DESIGNATING FLAG 2117 | ... |
|---|---|---|---|---|---|---|---|---|
| 1 | XXX | UserA | Sales report | COLOR/ BOTH SIDES/ NO INTENSIVE | E-MAIL | DEV222 | — | ... |
| 2 | XXX | UserB | Print job | MONOCHROME/ SINGLE SIDE/ 2in1 | E-MAIL | OFFICE A | — | ... |
| 3 | XXX | UserA | IR report | COLOR/ SINGLE SIDE/ NO INTENSIVE | E-MAIL | OFFICE B | — | ... |
| 4 | XXX | UserA | abc.doc | MONOCHROME/ BOTH SIDES/ 2in1 | WEB UPLOAD | — | ON | ... |
| 5 | YYY | UserD | def.doc | COLOR/ BOTH SIDES/ NO INTENSIVE | WEB UPLOAD | — | — | ... |
| 6 | YYY | UserA | xyz.xls | COLOR/ SINGLE SIDE/ NO INTENSIVE | E-MAIL | DEV444 | — | ... |
| 7 | XXX | UserC | ghi.ppt | MONOCHROME/ BOTH SIDES/ NO INTENSIVE | E-MAIL | DEV111 | — | ... |
| ... | ... | ... | ... | ... | ... | ... | ... | ... |

FIG.10

JOB PERFORMING RULE SETTING SCREEN

Please check conditions to permit direct print

☐ User's main work location and office to print are same
☐ User's main work location and office to print are different
☑ Designated device by user and device to print are same
☐ Designated device by user and device to print are different
☐ Job is input by e-mail
☐ Job is input by web upload (direct print is designated by user)
☑ Office corresponding to e-mail destination address and office to print are same
☑ Device corresponding to e-mail destination address and device to print are same

SET — 62
CANCEL — 64

| COMPANY CODE | JOB PERFORMING RULE 2118 |
|---|---|
| XXX | Designated device by user and device to print are same |
| | Office corresponding to e-mail destination address and office to print are same |
| | Device corresponding to e-mail destination address and device to print are same |
| | Job is input by web upload (direct print is designated by user) |
| YYY | User's main work location and office to print are same |
| | Job is input by e-mail |
| ... | ... |

FIG.12

| COMPANY CODE | COMPANY NAME | COUNTRY | LANGUAGE | ... |
|---|---|---|---|---|
| XXX | COMPANY A | JAPAN | JAPANESE | |
| YYY | COMPANY B | U.S. | ENGLISH | |

| COMPANY CODE | USER ID | PASSWORD | ROLE | USER ADDRESS DATA | MAIN WORK LOCATION | DESIGNATED DEVICE ID | ... |
|---|---|---|---|---|---|---|---|
| XXX | UserA | AAA | ADMINISTRATOR | userA@xxx.com | OFFICE A | DEV111 | ... |
| | UserB | BBB | USER | userB@xxx.com | OFFICE A | DEV222 | ... |
| | UserC | CCC | USER | userC@xxx.com | OFFICE B | DEV222 | ... |
| YYY | UserA | AAAA | ADMINISTRATOR | userA@yyy.com | — | DEV444 | ... |
| | UserD | DDD | USER | userD@yyy.com | — | DEV444 | ... |
| ... | ... | ... | ... | ... | ... | ... | ... |

| DEVICE ID | COMPANY CODE | PROVIDED OFFICE | DEVICE/OFFICE ADDRESS DATA | 233 ... |
|---|---|---|---|---|
| DEV111 | XXX | OFFICE A | DEV111.A@xxx.com | ... |
| DEV222 | XXX | OFFICE B | DEV222.B@xxx.com | ... |
| DEV333 | XXX | OFFICE B | DEV333.B@xxx.com | ... |
| DEV444 | YYY | — | DEV444@xxx.com | ... |
| — | XXX | OFFICE A | A@xxx.com | ... |
| — | XXX | OFFICE B | B@xxx.com | ... |
| ... | ... | ... | ... | ... |

FIG.15

| JOB ID | JOB STORED URL | ... |
|---|---|---|
| 1 | Job1/storage | ⋮ |
| 2 | Job2/storage | ⋮ |
| 3 | Job3/storage | ⋮ |
| 4 | Job4/storage | ⋮ |
| 5 | Job5/storage | ⋮ |
| 6 | Job6/storage | ⋮ |
| ⋮ | ⋮ | ⋮ |

JOB PERFORMING CONTROL SYSTEM, JOB PERFORMING SYSTEM AND JOB PERFORMING CONTROL METHOD

BACKGROUND OF THE INVENTION

1. Field of the Invention

The present invention relates to a job performing control system, a job performing system and a job performing control method.

2. Description of the Related Art

In recent times attention has been given to usage environments, typified by cloud services, in which web application functions or external server side application functions are provided as a service. For example, for a print service using a cloud, by sending and storing a print job to a server on the cloud, the print job can be performed by any image forming apparatuses at any place that is capable of accessing the server. With this, a user can perform a print job with an outside image forming apparatus by sending data to be printed by an e-mail or uploading the data by a web site to the server, for example.

On the other hand, as one method of printing using image forming apparatuses, device designated printing is known. In the device designated printing, a job (print job) is input with designating an image forming apparatus to print the job in a print driver. The designated image forming apparatus instantly prints the job when the job is input. Thus, this method is convenient for a user who is in a hurry.

Further, as another one of the methods of printing using the image forming apparatuses, on-demand printing is known. In the on-demand printing, a user can obtain a job list of jobs stored in a print server by logging-in an image forming apparatus, and then, the job selected from the job list is printed by the image forming apparatus. As the image forming apparatus prints the job after the user logs-in the image forming apparatus in the on-demand printing, the on-demand printing has a security higher than that of the device designated printing because the user can be prevented from leaving the printed document that causes leakage of the content to a third person.

However, the on-demand printing is inferior to the device designated printing with respect to simply and immediately performing the job because the user has to select a job to be performed after logging-in the image forming apparatus in the on-demand printing. As such, there are different advantages for the methods of printing. As both methods have different advantages, users wish to use an appropriate one based on the situation, the place or the like to perform a job.

However, conventionally, in the on-demand printing, there is a problem in that only a place or a device previously designated by a management tool or the like can be designated as a place or a device to print when a job is input using an e-mail. Further, although cases of using devices other than the devices normally used by users such as the print service using the cloud as described above are increasing, in such cases, the device designated printing may not be used.

Here, Patent Document 1 discloses a data output system by which a user can easily request printing of an attached file of an e-mail received by a mobile phone, for example.

However, according to the technique disclosed in Patent Document 1, methods such as the device designated printing or the like cannot be selected so that the above problems cannot be solved.

[Patent Document]
[Patent Document 1] Japanese Patent No. 4,042,321

SUMMARY OF THE INVENTION

The present invention is made in light of the above problems, and provides a technique capable of easily controlling a method of performing the job based on a method of inputting the job.

According to an embodiment, there is provided a job performing control system that includes at least an apparatus and controls a job performing apparatus that performs a job, including: a job storing unit that stores a job input in the job performing control system with attribute data of the job, the attribute data being set based on an inputting method of the job; a rule storing unit that stores a predetermined rule that determines a method of performing the job in the job performing apparatus; a determining unit that determines whether the attribute data of the job satisfies the predetermined rule; and a performing control unit that controls the job performing apparatus to perform the job determined to satisfy the predetermined rule by the determining unit by the method of performing the job determined from the predetermined rule.

According to another embodiment, there is provided a job performing system including a job performing apparatus that performs a job; and a job performing control system that includes at least an apparatus and controls the job performing apparatus. The job performing control system includes a job storing unit that stores a job input in the job performing control system with attribute data of the job, the attribute data being set based on an inputting method of the job, a rule storing unit that stores a predetermined rule that determines a method of performing the job in the job performing apparatus, a determining unit that determines whether the attribute data of the job satisfies the predetermined rule, and a performing control unit that controls the job performing apparatus to perform the job determined to satisfy the predetermined rule by the determining unit by the method of performing the job determined from the predetermined rule. The job performing apparatus includes a job performing unit that performs the job based on the method of performing.

According to another embodiment, there is provided a job performing control method performed by a job performing control system that includes at least an apparatus and controls a job performing apparatus that performs a job, including: a job storing step of storing a job input in the job performing control system with attribute data of the job, the attribute data being set based on an inputting method of the job; a rule storing step of storing a predetermined rule that determines a method of performing the job in the job performing apparatus; a determining step of determining whether the attribute data of the job satisfies the predetermined rule; and a performing control step of controlling the job performing apparatus to perform the job determined to satisfy the predetermined rule in the determining step by the method of performing the job determined from the predetermined rule.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 1 is a view illustrating an example of a structure of a job performing system of an example;

FIG. 9 is a view illustrating an example of data stored in a job attribute data storing unit;

FIG. 10 is a view illustrating an example of a screen for setting a job performing rule;

FIG. 11 is a view illustrating an example of data stored in a job performing rule data storing unit;

FIG. 12 is a view illustrating an example of data stored in an organization management data storing unit;

FIG. 13 is a view illustrating an example of data stored in a user management data storing unit;

FIG. 14 is a view illustrating an example of data stored in a device management data storing unit;

FIG. 15 is a view illustrating an example of data stored in a data management data storing unit;

DETAILED DESCRIPTION OF THE PREFERRED EMBODIMENTS

Figure 2A:
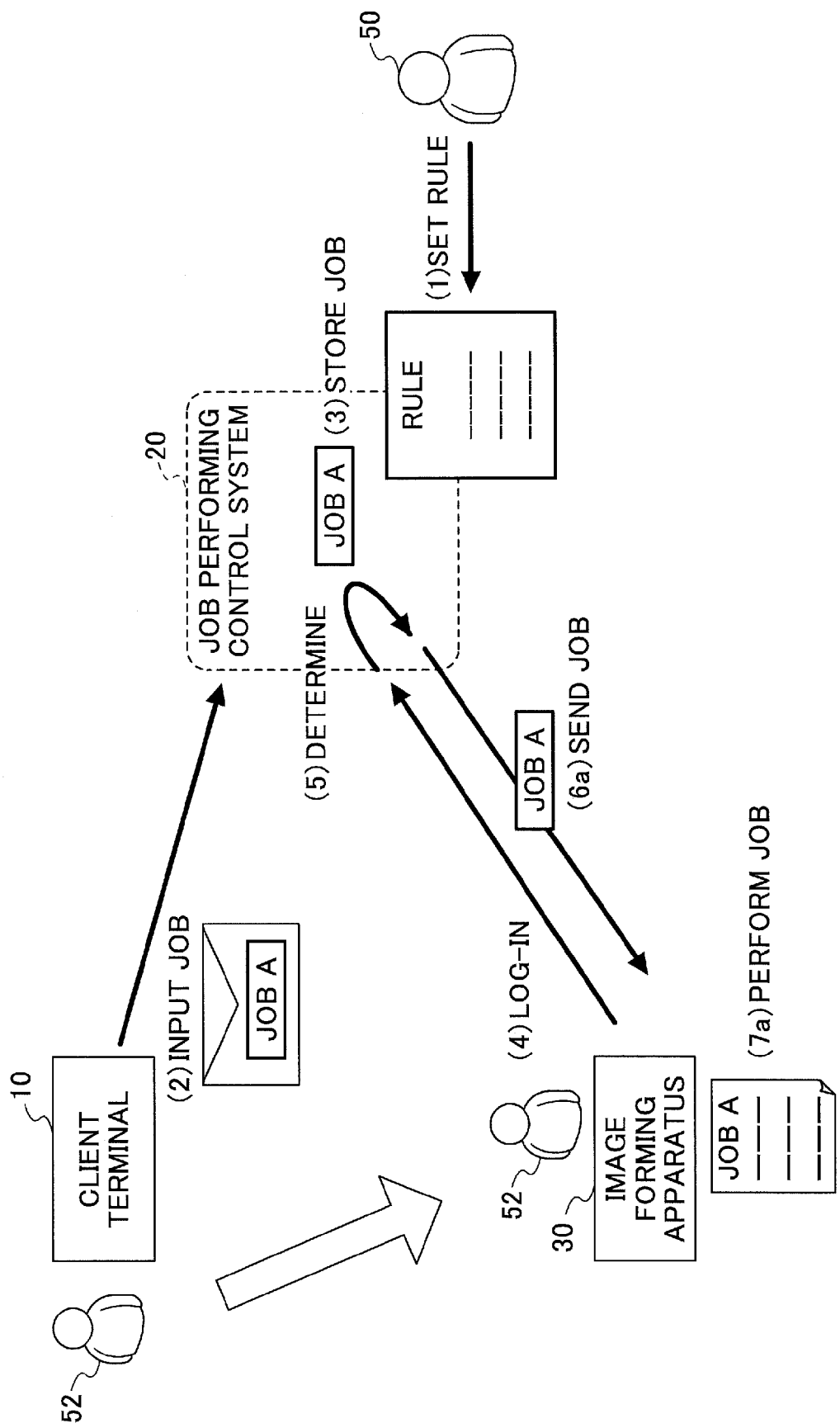
FIG. 2A and FIG. 2B are schematic views illustrating an example of an operation of the job performing system of the embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(System Structure)

FIG. 1 is a view illustrating an example of a structure of a job performing system 1 of the embodiment. The job performing system 1 includes a client terminal 10, a job performing control system 20, an image forming apparatus 30, a mail server 40 and the like. The job performing system 1 includes a private network N1 such as a network in an office or the like, a public network N2 represented by a cloud service or the like and a network N3 such as INTERNET or the like.

The network N1 and the network N3 are connected via a firewall FW of the network N1. The firewall FW is provided at a connecting point of the network N1 and the network N3 and relays an access from the network N1 to the network N3. The network N2 and the network N3 are connected via an access control apparatus 21 of the network N2. The security of the network N2 is protected by the access control apparatus 21. The network N1 is a private network that is provided inside the firewall FW. The client terminal 10 and the image forming apparatus 30 are connected to the network N1.

The client terminal 10 is an example of a terminal apparatus and is a Personal Computer (PC) 11, a mobile terminal 12 or the like, for example. The client terminal 10 may be a general data processing apparatus (a computer system) on which OS or the like is mounted. The client terminal 10 has a wireless or wired communication function. The mobile terminal 12 is a terminal capable of being carried by a user such as a smartphone, a mobile phone, a tablet PC or the like, for example.

The image forming apparatus 30 is an example of a job performing apparatus that performs a job. The image forming apparatus 30 is an apparatus that has an image forming function to perform a print job such as a printer, a Multifunction Peripheral (MFP) or the like, for example. The image forming apparatus 30 has a wireless or wired communication function. The image forming apparatus 30 is not limited to the printer, the MFP or the like, and may be a copying machine, a scanner, a projector or the like.

The job performing system 1 illustrated in FIG. 1 may include a plurality of the client terminals 10 and the image forming apparatuses 30.

The mail server 40 is connected to the network N3. The mail server 40 is a computer that transfers e-mails. For example, an e-mail with a predetermined address sent by the client terminal 10 is stored in the mail server 40 and is obtained by the job performing control system 20.

The network N2 is connected to the network N3 such as INTERNET or the like by the access control apparatus 21. The job performing control system 20 includes a print service providing apparatus 22, a scan service providing apparatus 23, another service providing unit 24 and the like, in addition to the access control apparatus 21. The access control apparatus 21, the print service providing apparatus 22, the scan service providing apparatus 23 and the other service providing unit 24 are connected to the network N2. For the job performing system 1 as illustrated in FIG. 1, the access control apparatus 21, the print service providing apparatus 22, the scan service providing apparatus 23 and the other service providing unit 24 actualize a job performing control system.

The access control apparatus 21 controls a log-in to services such as a print service provided by the print service providing apparatus 22, a scan service provided by the scan service providing apparatus 23 or the like. The access control apparatus 21, the print service providing apparatus 22, the scan service providing apparatus 23 and the other service providing unit 24 are actualized by one or more data processing apparatuses (computer systems).

The print service providing apparatus 22, the scan service providing apparatus 23 and the other service providing unit 24 of the job performing system 1 illustrated in FIG. 1 may be actualized by a single computer or may be actualized by a plurality of distributed computers.

Figure 2B:
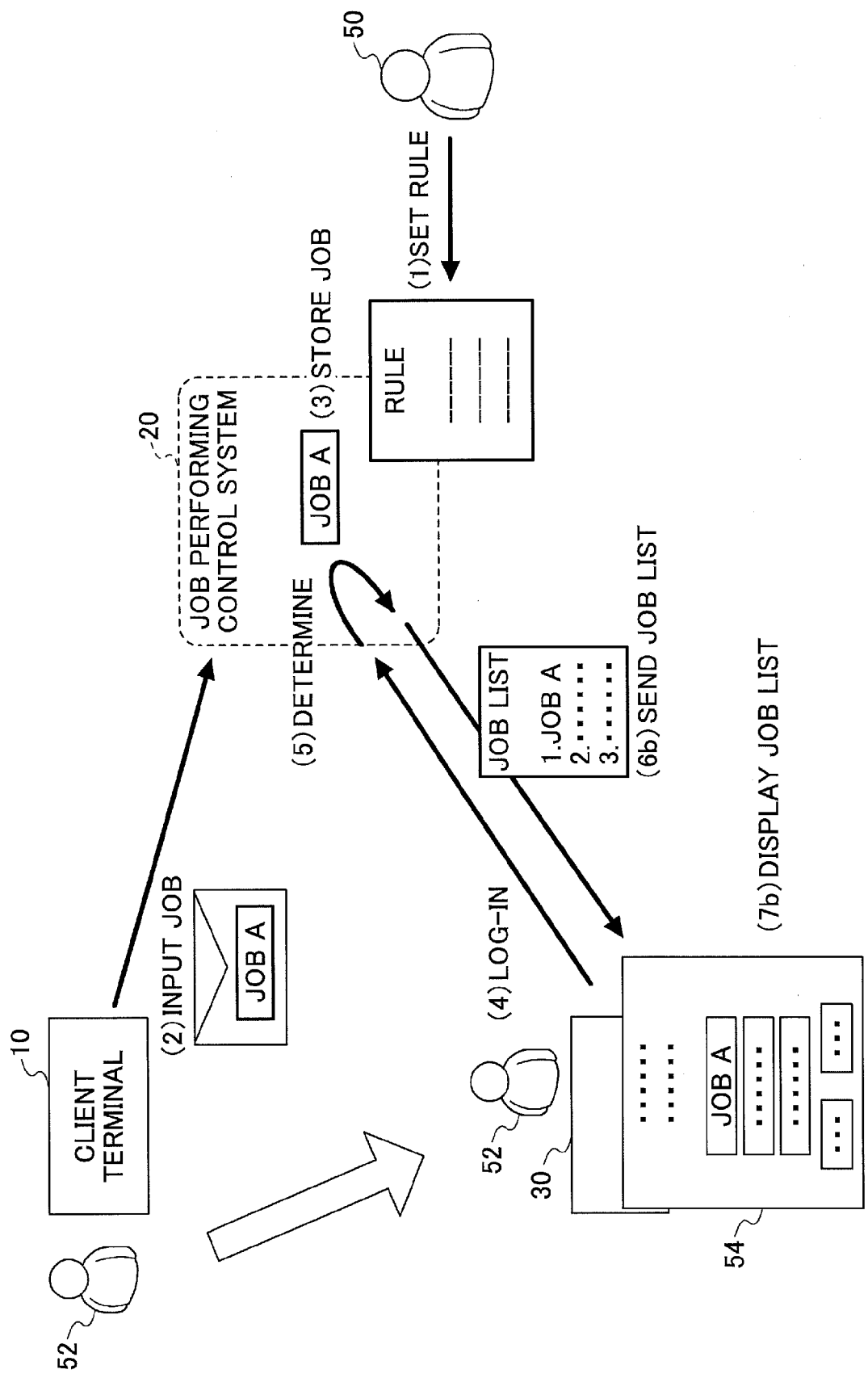

FIG. 2A and FIG. 2B are schematic views illustrating an example of an operation of the job performing system 1 of the embodiment. The operation of the job performing system 1 of the embodiment is explained with reference to FIG. 2A and FIG. 2B.

First, the operation is explained with reference to FIG. 2A.

(1) An administrator 50 of the job performing system 1 previously sets a job performing rule that defines a method of performing (outputting, printing or the like) a job, to the job performing control system 20.

In this embodiment, the job performing rule is a condition to perform a job by a direct print. Here, in this embodiment, a method of printing by which the job is performed (printed) without selecting a job to be performed from a job list, after a user inputs the job in the job performing control system 20 and logs-in the image forming apparatus 30 is referred to as a "direct print".

When a user logs-in the image forming apparatus 30 to perform a job and the job is determined to satisfy the job performing rule, the job is directly performed (output, printed or the like), without displaying a job list screen for on-demand printing that includes various instruction data such as a job name or the like, to the user. The job performing rule is, for example, conditions such as "job is printed using an image forming apparatus 30 previously designated by a user", "job is sent by an e-mail (attached to an e-mail)" or the like.

(2) When a user 52 operates the client terminal 10 and sends an e-mail attached with a job A to be performed to a predetermined address, it means that the job A is input in the performing control system 20. Here, alternatively, the job A may be input by another method such as uploading using a web page (web upload) or the like.

(3) The job A sent by the user 52 is stored in the job performing control system 20.

(4) When the user 52 logs-in the image forming apparatus 30 for performing the job A, the image forming apparatus 30 sends a log-in request to the job performing control system 20.

(5) The job performing control system 20 determines whether the job A satisfies the job performing rule based on the previously set job performing rule.

(6a) When the job A is determined to satisfy the job performing rule, the job performing control system 20 sends the job A to the image forming apparatus 30.

(7a) The image forming apparatus directly performs (outputs, prints) the received job A.

Here, in the above processes (4) to (7a), if another job other than the job A exists that is determined to satisfy the job performing rule, the other job is also directly performed by the image forming apparatus.

FIG. 2B illustrates an operation of the job performing system 1 of the embodiment when the job A is determined not to satisfy the job performing rule in (5) illustrated in FIG. 2A. The processes in (1) to (5) of FIG. 2B are the same as those of FIG. 2A.

(6b) When the job A and other jobs input in the performing control system 20 by the user 52 are determined not to satisfy the job performing rule in (5), a normal on-demand printing is performed. At this time, the job performing control system 20 sends a job list of the jobs input in the performing control system 20 by the user 52, to the image forming apparatus 30.

(7b) The image forming apparatus 30 displays a selection screen 54 including the job list for selecting a job for the on-demand printing. The selection screen 54 includes a user name of the user 52, the job list, a print button, a delete button and the like. Then, when the user selects a job based on the screen, the image forming apparatus 30 sends a request of obtaining the selected job to the job performing control system 20. Thereafter, the selected job is sent to the image forming apparatus 30 from the job performing control system 20 and the image forming apparatus 30 performs (outputs, prints) the selected job.

As such, according to the job performing system 1 of the embodiment, if a job satisfies the job performing rule, a procedure for a user to select a job to be printed from a job list can be omitted so that the processes necessary to obtain a printed document can be simplified. According to the embodiment, the job performing rule can be set based on the method of inputting the job such as "job is sent by an e-mail (attached to an e-mail)" or the like. Thus, for example, when the job is input by the e-mail, as it is assumed that the user is in a hurry when the job is input, the job is directly performed (printed) right after the user logs-in the image forming apparatus.

(Hardware Structure)

Figure 3:
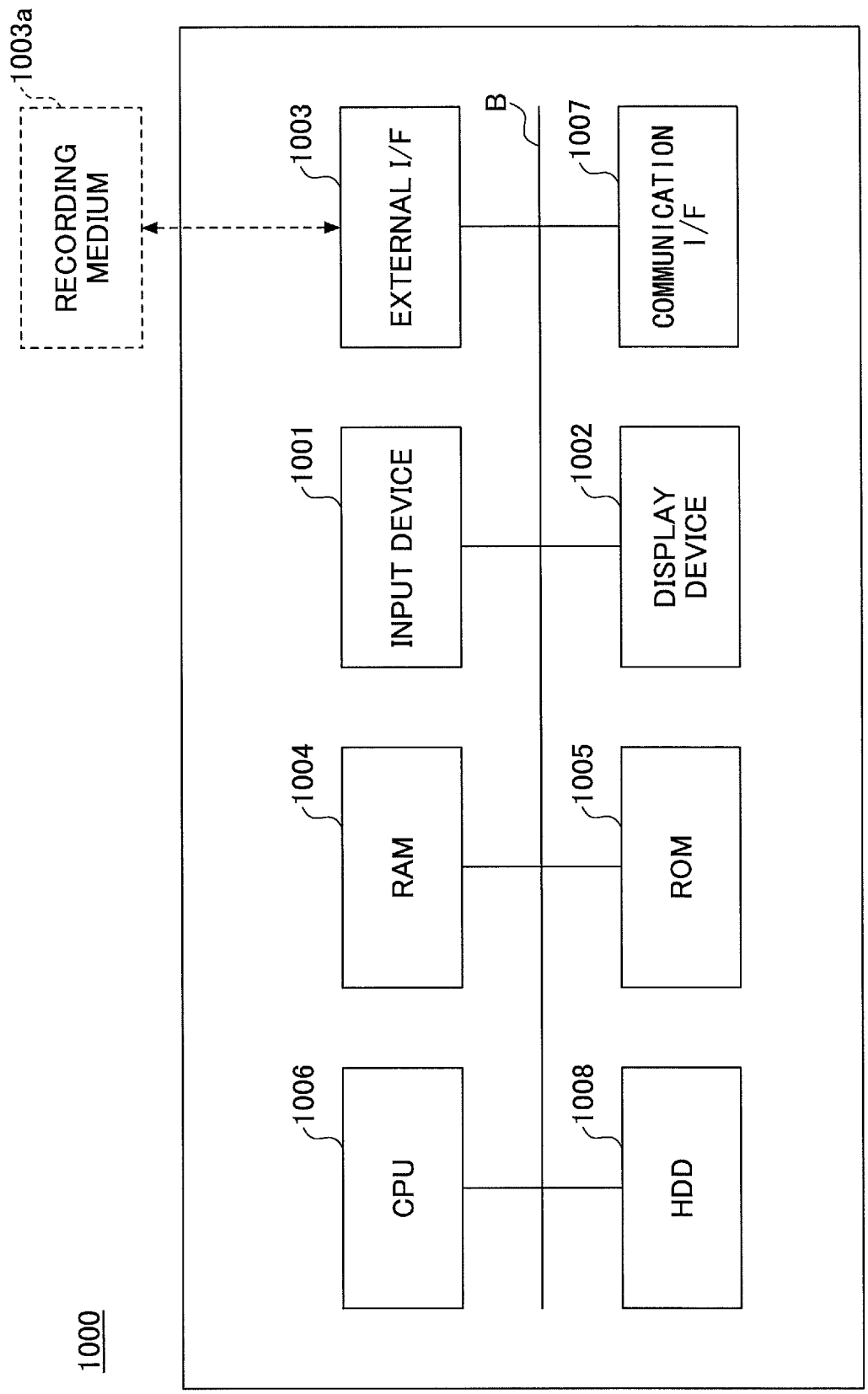
FIG. 3 is a view illustrating an example of a hardware structure of a computer system of the embodiment.

FIG. 3 is a view illustrating an example of a hardware structure of a computer system of the embodiment. The client terminal 10, the access control apparatus 21, the print service providing apparatus 22, the scan service providing apparatus 23, the other service providing unit 24, the image forming apparatus 30 and the mail server 40 illustrated in FIG. 1 may be actualized by the computer system having a hardware structure as illustrated in FIG. 3, for example.

The computer system 1000 includes an input device 1001, a display device 1002, an external I/F 1003, a Random Access Memory (RAM) 1004, a Read Only Memory (ROM) 1005, a Central Processing Unit (CPU) 1006, a communication I/F 1007, a Hard Disk Drive (HDD) 1008 and the like that are connected with each other via a bus B.

The input device 1001 includes a keyboard, a mouse, a touch panel or the like, and is used by a user to input operation signals. The display device 1002 includes a display or the like, and displays processed results by the computer system 1000.

The communication I/F 1007 is an interface that connects the computer system 1000 to the network N1 or N2. The computer system 1000 may perform a data communication via the communication I/F 1007.

The HDD 1008 is a non-volatile storage device that stores programs or data. The programs or data stored in the HDD 1008 include an Operating System (OS) that is basic software to control the entirety of the computer system 1000, application software that provide various functions on the OS, or the like. The HDD 1008 manages the program or data stored therein by a predetermined file system and/or a database (DB).

The external I/F 1003 is an interface between an external device. The external device may be a recording medium 1003a or the like. The computer system 1000 is capable of reading and writing data from and on the recording medium 1003a via the external I/F 1003. The recording medium 1003a may be a flexible disk, a Compact Disk (CD), a Digital Versatile Disk (DVD), an SD Memory card, a Universal Serial Bus memory or the like.

The ROM 1005 is a non-volatile semiconductor memory (storage device) capable of storing programs or data even when a power supply is off. The ROM 1005 stores programs or data such as a Basic Input/Output System (BIOS) that is executed when the computer system 1000 is activated, a setting of the OS, a setting of networks or the like. The RAM 1004 is a volatile semiconductor memory (storage device) that temporarily stores programs or data.

The CPU 1006 is an arithmetic device that controls and actualizes functions of the entirety of the computer system 1000 by reading out the programs or data from storage devices such as the ROM 1005, the HDD 1008 or the like on the RAM 1004 and executing processes.

The client terminal 10, the access control apparatus 21, the print service providing apparatus 22, the scan service providing apparatus 23, the other service providing unit 24 and the mail server 40 of the embodiment illustrated in FIG. 1 may actualize various processes, which will be explained later, by the hardware structure of the computer system 1000.

Figure 4:
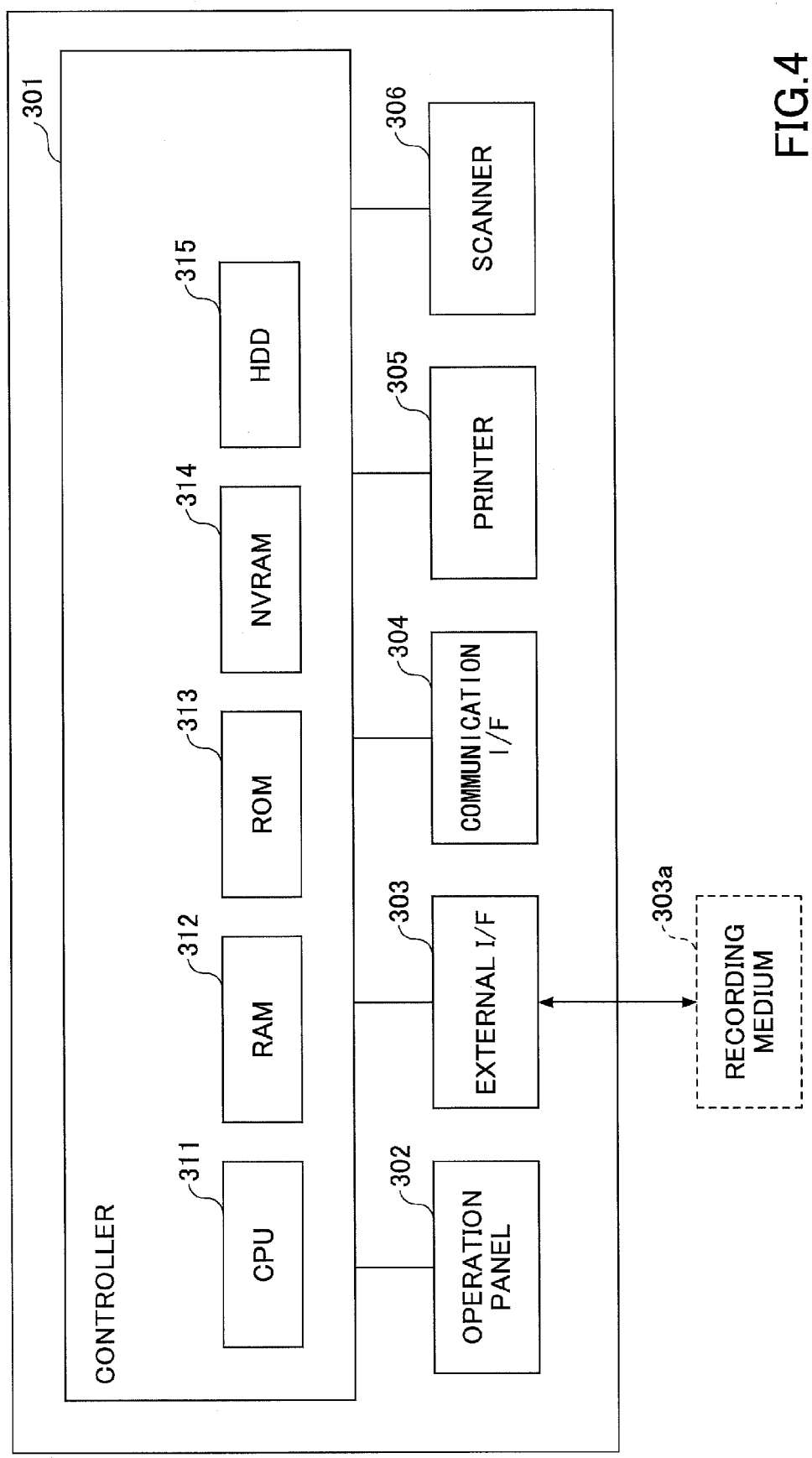
FIG. 4 is a view illustrating an example of a hardware structure of an image forming apparatus of the embodiment.

FIG. 4 is a view illustrating an example of a hardware structure of the image forming apparatus 30 of the embodiment. The image forming apparatus 30 includes a controller 301, an operation panel 302, an external I/F 303, a communication I/F 304, a printer 305, a scanner 306 and the like.

The controller 301 includes a CPU 311, a RAM 312, a ROM 313, an NVRAM 314, a HDD 315 and the like. The ROM 313 stores various programs or data. The RAM 312 temporarily stores programs or data. The NVRAM 314 stores setting data or the like, for example. The HDD 315 stores various programs or data.

The CPU 311 is a calculation device that controls and actualizes functions of the entirety of the image forming apparatus 3 by reading out the programs, the data, the setting data or the like from the ROM 313, the NVRAM 314, the HDD 315 or the like on the RAM 312 and executing processes.

The operation panel 302 includes an input unit that accepts an input from a user and a display unit that displays data. The external I/F 303 is an interface between an external device. The external device may be a recording medium 303*a* or the like. The image forming apparatus 30 is capable of reading and writing data from and on the recording medium 303*a* via the external I/F 303. The recording medium 303*a* may be an IC card, a flexible disk, a CD, a DVD, an SD Memory card, a Universal Serial Bus memory or the like.

The communication I/F 304 is an interface that connects the image forming apparatus 30 to the network N1. The image forming apparatus 30 is capable of having a data communication via the communication I/F 304.

The printer 305 is a printing device that prints print data on a paper. The scanner 306 is a reading device that obtains image data from a document.

The image forming apparatus 30 of the embodiment may actualize various processes, which will be explained later, by the above described hardware structure.

(Functional Structure)
(Client Terminal)

Figure 5:
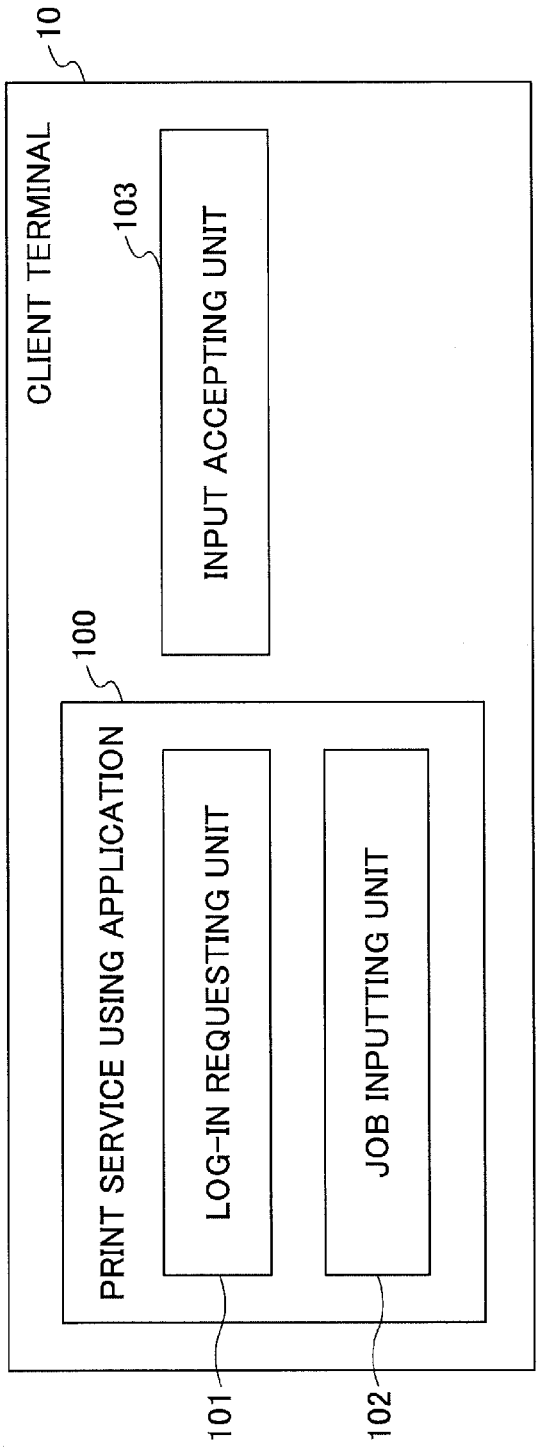
FIG. 5 is a view illustrating an example of a functional structure of a client terminal of the embodiment.

The client terminal 10 of the embodiment is actualized by a functional structure as illustrated in FIG. 5, for example. FIG. 5 is a view illustrating an example of a functional structure of the client terminal 10 of the embodiment. Each function may be actualized by the CPU that executes programs in cooperation with the hardware structure.

The client terminal 10 includes a log-in requesting unit 101, a job inputting unit 102, an input accepting unit 103 and the like. The log-in requesting unit 101 and the job inputting unit 102 are functions included in a print service using application 100.

The log-in requesting unit 101 requests a log-in to the job performing control system 20 by sending authentication data. The authentication data of the embodiment may include user identification data (user ID) that uniquely identifies a user, a password and group identification data (hereinafter, referred to as a "company code") that identifies a group such as a company, an organization or the like to which the user belongs.

The job inputting unit 102 inputs (sends) a job in (to) the job performing control system 20. When the print service is used, the job means a print job. The job is input by the job inputting unit 102 by sending an e-mail attached with the job to be performed, web uploading or the like. When the job is sent by the e-mail, address data corresponding to the place (office) or the image forming apparatus 30 that performs the job is set for an e-mail destination address. The e-mail sent from the job inputting unit 102 is stored in the mail server 40.

The input accepting unit 103 accepts an input by a user operation such as a touch panel contacting operation, a keyboard input operation or the like.

(Image Forming Apparatus)

Figure 6:
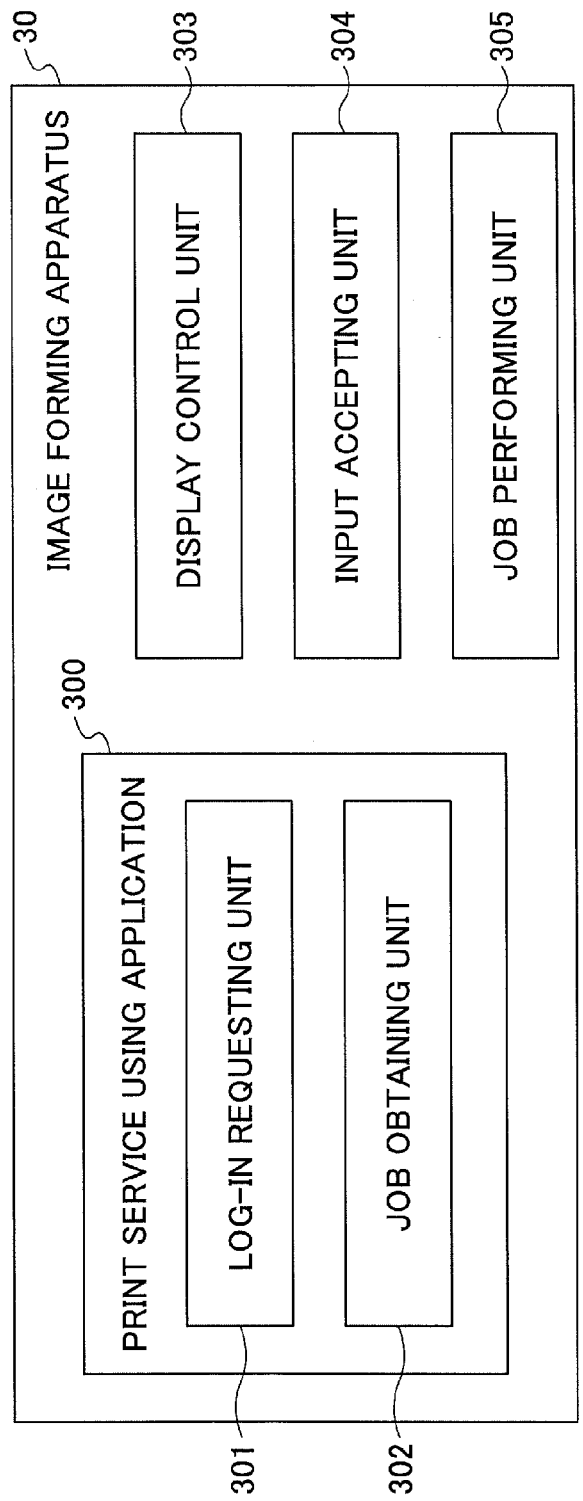
FIG. 6 is a view illustrating an example of a functional structure of the image forming apparatus of the embodiment.

The image forming apparatus 30 of the embodiment is actualized by a functional structure illustrated in FIG. 6, for example. FIG. 6 is a view illustrating an example of a functional structure of the image forming apparatus 30 of the embodiment. Each function may be actualized by the CPU that executes programs in cooperation with the hardware structure.

The image forming apparatus 30 of the embodiment includes a log-in requesting unit 301, a job obtaining unit 302, a display control unit 303, an input accepting unit 304, a job performing unit 305 and the like. The log-in requesting unit 301 and the job obtaining unit 302 are functions included in print service using application 300.

The log-in requesting unit 301 sends a log-in request for obtaining a job or a job list to the job performing control system 20. The log-in request by the log-in requesting unit 301 includes a user ID, a password and a company code of a user who requests to log-in and device ID that uniquely identifies the image forming apparatus 30 to which the log-in is requested. The password and the company code may be optionally required for the log-in request by the log-in requesting unit 301.

Then the log-in succeeds, the job obtaining unit 302 obtains a job or a job list from the job performing control system 20 as a response to the log-in request.

The display control unit 303 displays a job selection screen for performing a normal on-demand printing based on the job list obtained by the job obtaining unit 302.

The input accepting unit 304 accepts an input by a user operation such as a touch panel touching operation, a keyboard input operation or the like. The input accepting unit 304 accepts an input of authentication data such as a user ID, a password or the like from a user, for example.

The job performing unit 305 performs (prints) the obtained job.

(Job Performing Control System)

Figure 7:
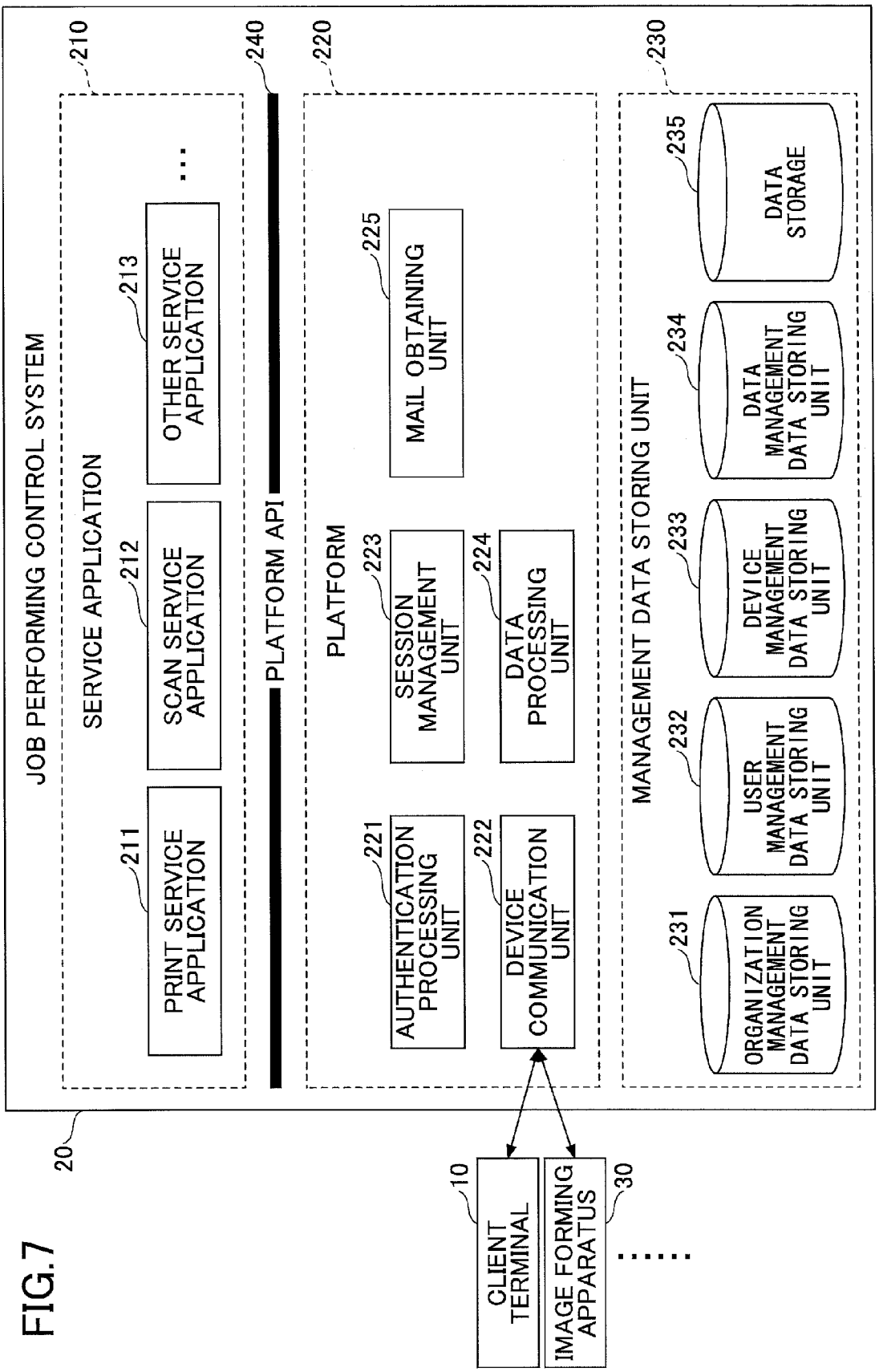
FIG. 7 is a view illustrating an example of a functional structure of a job performing control system of the embodiment.

The job performing control system 20 of the embodiment is actualized by a functional structure as illustrated in FIG. 7, for example. FIG. 7 is a view illustrating an example of a functional structure of the job performing control system 20 of the embodiment. The job performing control system 20 includes service application 210, a platform 220, a management data storing unit 230 and a platform Application Programming Interface (API) 240. These are structured by a program stored in the job performing control system 20 and to be executed by the CPU.

The service application 210 includes print service application 211, scan service application 212, and one or more other service application 213, as an example.

Figure 8:
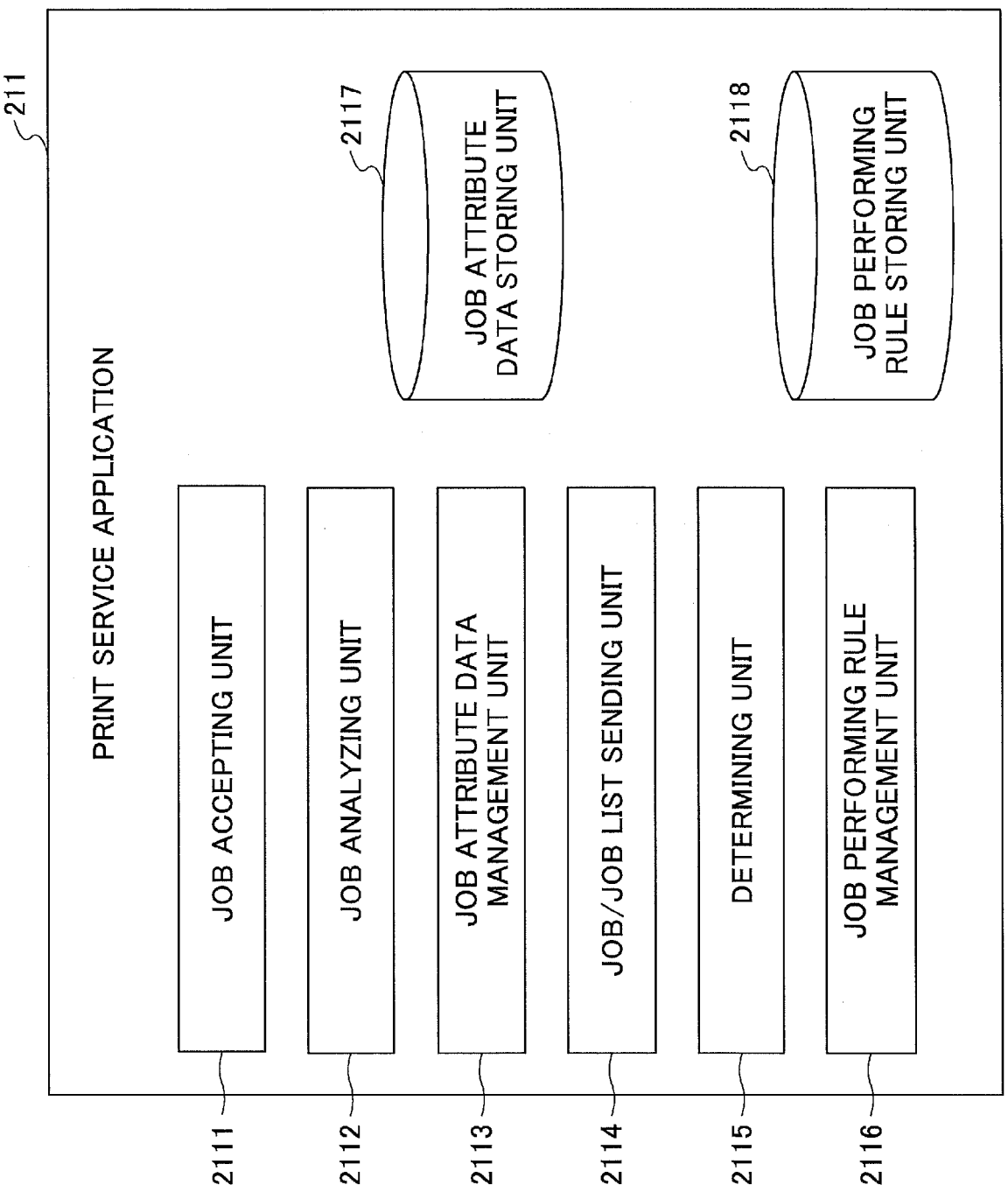
FIG. 8 is a view illustrating an example of a functional structure of a print service application of the embodiment.

The print service application 211 is an application program that provides a print service, and has functions illustrated in FIG. 8. FIG. 8 is a view illustrating an example of a functional structure of the print service application 211 of the embodiment. As illustrated in FIG. 8, the print service application 211 includes a job accepting unit 2111, a job analyzing unit 2112, a job attribute data management unit 2113, a job/job list sending unit 2114, a determining unit 2115, a job performing rule management unit 2116, a job attribute data storing unit 2117, a job performing rule storing unit 2118 and the like.

The job accepting unit 2111 accepts a job input from the client terminal 10. When the job is input by an e-mail, the job accepting unit 2111 receives data included in the job (a body of the e-mail and an attached file) from the mail obtaining unit 225. Further, when the job is input by a web upload, the job accepting unit 2111 receives the job sent from the client terminal 10 via the session management unit 223. Then, the job accepting unit 2111 transfers the received job to the job analyzing unit 2112.

The job analyzing unit 2112 analyzes the job transferred from the job accepting unit 2111. Specifically, the job analyzing unit 2112 specifies user management data (the user ID, the company code or the like) of the user of the client terminal 10 who inputs the job, or extracts the print property included in the job. Then, the job analyzing unit 2112 instructs the job attribute data management unit 2113 to store data (hereinafter, referred to as "job attribute data") regarding the job specified by the analysis in the job attribute data storing unit 2117. Further, the job analyzing unit 2112 determines a data conversion content of the input job, adds a job ID that identifies the job to the job and stores the job in the data storage 235.

The job attribute data management unit 2113 stores or reads out job attribute data corresponding to the input job in and from the job attribute data storing unit 2117 based on a request from the job analyzing unit 2112.

The job attribute data storing unit 2117 stores job attribute data as illustrated in FIG. 9. FIG. 9 is a view illustrating an example of data stored in the job attribute data storing unit 2117. As illustrated in FIG. 9, the job attribute data storing unit 2117 stores items such as "job ID", "company code", "user ID", "job name", "print setting", "job inputting method", "e-mail destination device/office data", "direct print designating flag" and the like. Although not illustrated in the drawings, the job attribute data storing unit 2117 may further store an item such as "conversion status" or the like.

The "job ID" is identification data that uniquely identifies the job in the job performing control system 20. The "company code" is a company code of an organization (company) to which the user who inputs the job belongs. The "user ID" is identification data that identifies the user who inputs the job. Here, when the job is input by an e-mail, the "company code" and the "user ID" of the user who inputs the job are set based on the sender address of the e-mail. On the other hand, when the job is input by web upload, the "company code" and the "user ID" of the user who inputs the job are set based on a user ID that is input when the logs-in the client terminal 10. The "job name" is a name of the job and arbitrarily set by the user.

The "print setting" is a so-called print property that is applied when performing (printing) the job and includes conditions such as color/monochrome, single side/both sides, with/without intensive (2 in 1 or the like) or the like. Further, the "print setting" may further include data such as with or without staple, with or without punches, the printing number, paper size or the like.

The "job inputting method" is data indicating a method of inputting the job, that is, whether the job is input by an e-mail or web upload. The "e-mail destination device/office data" is data indicating a device (device ID of the image forming apparatus 30) or an office name corresponding to the destination address of the e-mail that is set when the job is input by the e-mail. The "direct print designating flag" is data indicating whether a direct print is designated by the user that is set when the job is input by the web upload.

Referring back to FIG. 8, upon accepting a log-in request from the image forming apparatus 30, the job/job list sending unit 2114 requests the determining unit 2115 to determine whether to perform a direct print based on the job performing rule of the job. Here, the log-in request includes user ID of a user who performs a log-in operation (inputting ID/password, having a card reader of the image forming apparatus 30 read an IC card, or the like) to the image forming apparatus 30 and device ID of the image forming apparatus 30. Then, the job/job list sending unit 2114 sends the job or the job list to the image forming apparatus 30 based on the determined result by the determining unit 2115. Specifically, when it is determined that the job performing rule is satisfied, in other words, when it is determined that a condition to perform the direct print is satisfied, the job/job list sending unit 2114 sends the job. On the other hand, when it is determined that the job performing rule is not satisfied, the job/job list sending unit 2114 sends the job list.

The determining unit 2115 determines whether the job attribute data of the job corresponding to the user ID included in the log-in request satisfies the job performing rule stored in the job performing rule data storing unit 2118 based on the instruction from the job/job list sending unit 2114. Then, the determining unit 2115 outputs the determined result to the job/job list sending unit 2114.

The job performing rule management unit 2116 stores the job performing rule in the job performing rule data storing unit 2118 or reads out the job performing rule stored in the job performing rule data storing unit 2118. The job performing rule management unit 2116 accepts a job performing rule input by an administrator or the like and stores it in the job performing rule data storing unit 2118.

FIG. 10 is a view illustrating an example of a job performing rule setting screen 60. The administrator or the like sets the job performing rule using the job performing rule setting screen 60 as illustrated in FIG. 10, for example, that is displayed when logging-in. For example, when the administrator or the like selects (checks a check box) a condition (job performing rule) to permit the direct print based on the job performing rule setting screen 60 and pushes a set button 62, the job performing rule management unit 2116 stores the checked job performing rule in the job performing rule data storing unit 2118. A cancel button 64 is also displayed in the job performing rule setting screen 60. Here, the job performing rules illustrated in FIG. 10 are just examples and the number of and the content of the job performing rules are not limited to those illustrated in FIG. 10.

FIG. 11 is a view illustrating an example of data stored in the job performing rule data storing unit 2118. As illustrated in FIG. 11, the job performing rule data storing unit 2118 stores the job performing rules selected by the administrator or the like among the job performing rules illustrated in FIG. 10, for example, for each of the organization (company code). As illustrated in FIG. 11, the job performing rule data storing unit 2118 stores the job performing rule(s) that is a condition(s) to permit the direct print in correspondence with the company code.

Referring back to FIG. 8, the scan service application 212 is an application that provides a scan service. The other service application 213 is an application that provides an arbitral service.

Referring back to FIG. 7, the platform API 240 is an interface for the service application 210 such as the print service application 211, the scan service application 212, the other service application 213 or the like to use the platform 220. The platform API 240 is an interface that is previously defined so that the platform 220 is capable of receiving a request from the service application 210 and is structured by a function, a class or the like, for example. Here, when the job performing control system 20 is structured by a plurality of data processing apparatuses, web API that is capable of being used via a network, for example, may be used as the platform API 240.

The platform 220 includes an authentication processing unit 221, a device communication unit 222, a session management unit 223, a data processing unit 224, a mail obtaining unit 225 and the like.

The authentication processing unit 221 performs an authentication based on a log-in request from the client terminal 10, the image forming apparatus 30 or the like. The authentication processing unit 221 accesses a user management data storing unit 232, which will be explained later, to authenticate the user. Further, the authentication processing unit 221 accesses an organization management data storing unit 231 and a device management data storing unit 233 to authenticate the image forming apparatus 30 or the like.

The device communication unit 222 performs a communication between the client terminal 10 and the image forming apparatus 30.

The session management unit 223 manages a session with the client terminal 10 and the image forming apparatus 30.

The data processing unit 224 processes data sent from the client terminal 10 and the image forming apparatus 30 and data stored in the data storage 235. The data processing unit 224 converts a data format of the application data to be printed in a Page Description Language (PDL) format, deletes the data stored in the data storage 235 or the like, for example.

The mail obtaining unit 225 periodically performs a polling to the mail server 40 and obtains e-mail having a predetermined address (domain). Then, the mail obtaining unit 225 extracts an attached file from the obtained e-mail and outputs the obtained mail body and the attached file to the print service application 211.

The management data storing unit 230 includes the organization management data storing unit 231, the user management data storing unit 232, the device management data storing unit 233, a data management data storing unit 234 and a data storage 235.

The organization management data storing unit 231 stores organization management data as illustrated in FIG. 12. FIG. 12 is a view illustrating an example of the data stored in the organization management data storing unit 231. As illustrated in FIG. 12, the organization management data includes items such as "company code", "company name", "country", "language" or the like. The "company code" is identification data that identifies the company (organization). The "company name" is a name of the company (organization). The "country" is a country name to which the company (organization) belongs. The "language" is the language used in the company (organization).

The user management data storing unit 232 stores user management data as illustrated in FIG. 13. FIG. 13 is a view illustrating an example of the data stored in the user management data storing unit 232. As illustrated in FIG. 13, the user management data includes items such as "company code", "user ID", "password", "role", "user address data", "main work location", "designated device ID" and the like.

The "company code" is the same as the above described company code and is a company code of the organization (company) to which the user belongs. The "user ID" is identification data that identifies the user. It is necessary for the "user ID" to be unique among users of the same company code, and as long as this condition is satisfied, the "user ID" may be a user name. Further, for the "user ID", data that identifies an electronic medium (an IC card, for example) possessed by the user may be used. For the electronic medium possessed by the user, an IC card, a mobile phone, a tablet terminal, an electronic book terminal or the like may be used. For data that identifies the electronic medium, a card ID, a serial ID, telephone number of the mobile phone, profile data of the terminal or the like may be used. The data that identifies the electronic medium may be the combination of the above examples.

The "password" is authentication data that is referred to when a log-in request from the client terminal 10 or the image forming apparatus 30 is accepted. Here, the "password" is optionally provided. The "role" is data indicating whether the user is an administrator or a normal user.

The "user address data" is an e-mail address of the user, for example. The "user address data" is a sender address when the job is input by the e-mail from the client terminal 10. The "main work location" is data indicating a place where the user ordinary work at (not a business trip destination), and is an office name, for example. The "designated device ID" is a device ID that uniquely identifies the image forming apparatus 30. For the "designated device ID", a device ID of the image forming apparatus 30 that is often used by the user or a default value may be set.

The device management data storing unit 233 (an example of a job performing place data storing unit) stores device management data that is data regarding the image forming apparatus 30 as illustrated in FIG. 14. FIG. 14 is a view illustrating an example of data stored in the device management data storing unit 233. As illustrated in FIG. 14, the device management data includes items such as "device ID", "company code", "provided office", "device/office address data" and the like.

The "device ID" is identification data that uniquely identifies the image forming apparatus 30 and may be a device ID of the image forming apparatus 30. Alternatively, the "device ID" may be a MAC address or the like of the image forming apparatus 30, for example.

The "company code" is the same as the above described "company code" and may be the company code of the organization (company) that manages the image forming apparatus 30. The "provided office" is a name of the office where the image forming apparatus 30 is provided.

The "device/office address data" is address data such as an e-mail address or the like provided for each of the image forming apparatuses 30 or each office, for example. For the example illustrated in FIG. 14, address data corresponding to the device ID "DEV111" is "DEV111.A@xxx.com", and address data corresponding to "office A" whose device ID is not set is "A@xxx.com". When the user inputs a job, the user can change whether to perform a direct print for the job based on the job performing rule by setting address data corresponding to a device to perform the job or a place (office) to perform the job.

The data management data storing unit 234 stores a place (URI) or the like of data such as an electronic file or the like included in the job that is stored in the data storage 235. FIG. 15 is a view illustrating an example of data stored in the data management data storing unit 234. As illustrated in FIG. 15, the data management data includes items such as "job ID", "job stored URL" and the like. The "job ID" is the same as the above described job ID and is identification data that identifies the input job or the like. The "job stored URL" is data indicating a place where the data of the input job is stored.

The data storage 235 stores data such as an electronic document file or the like included in the job.

The structure of units illustrated in FIG. 7 is just an example and the units illustrated in FIG. 7 may not be structured or layered as such.
(Operations in Detail)

Operations of the job performing system 1 of the embodiment is explained in detail in the following.

The operation of the job performing system 1 mainly includes "1. Process of inputting (sending) job" and "2. Process of performing job". First, the "process of inputting (sending) job" is explained.

1. Process of Inputting Job
(Process of Inputting Job by e-Mail)

Figure 16:
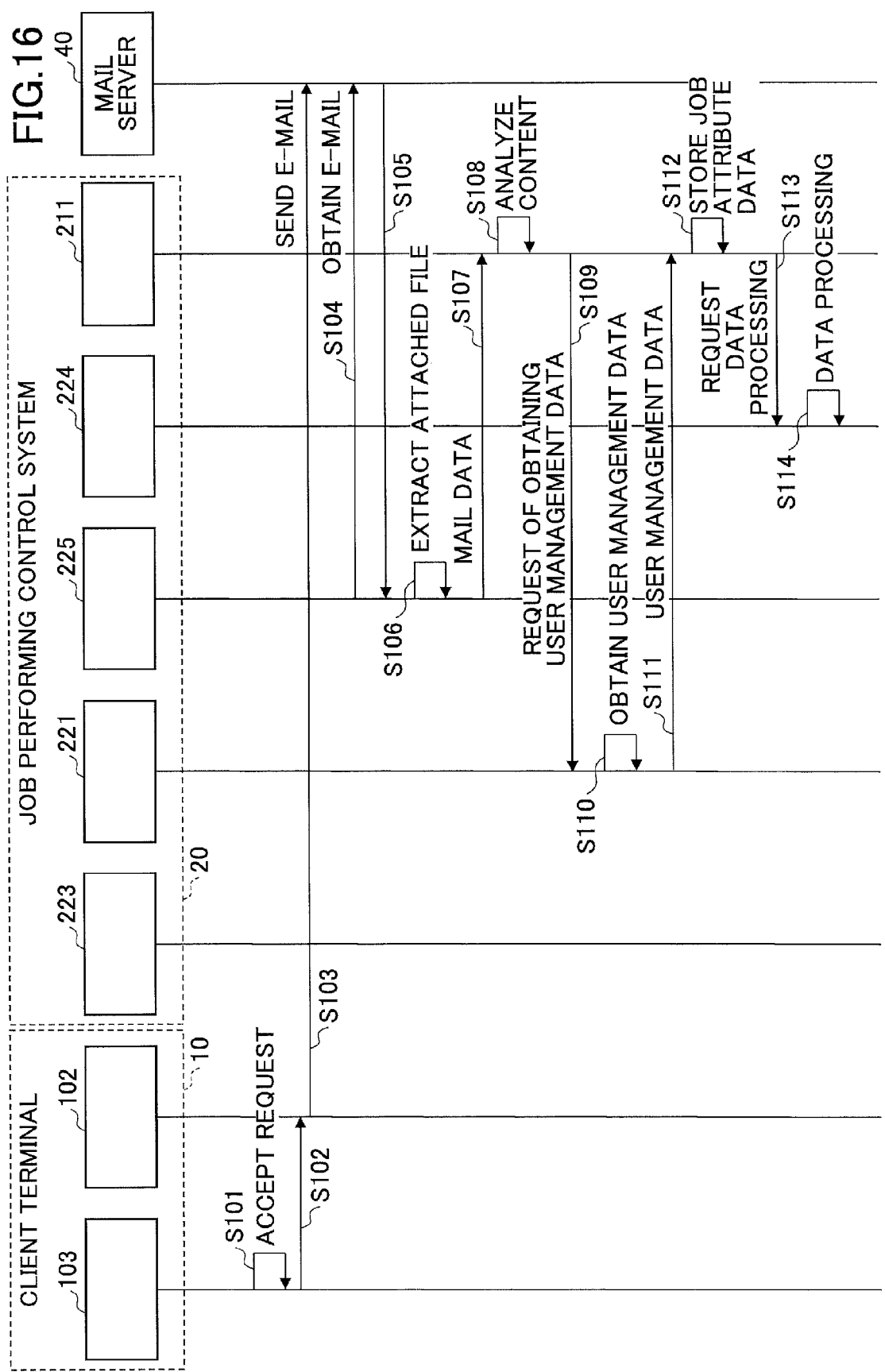
FIG. 16 is a sequence diagram illustrating an example of a process of inputting a job by an e-mail of the embodiment.

FIG. 16 is a sequence diagram illustrating an example of a process of inputting a job by an e-mail of the embodiment.

In step S101, the input accepting unit 103 of the client terminal 10 accepts a request of sending an e-mail whose destination address is address data of the print service application 211 and indicating to input a job from a user (the person who instructs to input the job). The address data of the print service application 211 is an e-mail address corresponding to the image forming apparatus 30 that performs the job or the place (office) where the job is to be performed. The user may previously know the address data, or the address data may be put on the target image forming apparatus 30 or the like so that the user can recognize the address data.

In step S102, the input accepting unit 103 transfers the request of sending the e-mail accepted from the user to the job inputting unit 102. In step S103, the job inputting unit 102 sends the e-mail requested by the user to the mail server 40.

In steps S104 to S105, the mail obtaining unit 225 of the job performing control system 20 receives the e-mail from the mail server 40 by polling, for example. The mail obtaining unit 225 may receive the e-mail when a request of obtaining the e-mail is requested by the print service application 211.

In step S106, when the mail obtaining unit 225 receives the e-mail, if an attached file is attached to the e-mail, the mail obtaining unit 225 extracts the attached file from the e-mail. The attached file is not essential. In step S107, the mail obtaining unit 225 sends a mail body and the attached file (if it is attached) as mail data to the print service application 211.

In step S108, the job accepting unit 2111 of the print service application 211 causes the job analyzing unit 2112 to analyze the content of the received mail data. Specifically, the job analyzing unit 2112 of the print service application 211 obtains an URL, a destination address and a sender address that is a mail address of the user that are described in the mail body.

In step S109, the job analyzing unit 2112 of the print service application 211 sends a request of obtaining user management data to the authentication processing unit 221 by designating the sender address and the destination address in the received mail data.

In step S110, the authentication processing unit 221 refers to the user management data storing unit 232 and obtains the user management data corresponding to the sender address and the destination address. In step S111, the authentication processing unit 221 sends the user management data corresponding to the sender address and the destination address to the print service application 211.

In step S112, the job analyzing unit 2112 of the print service application 211 stores job attribute data in which a job ID that specifies the job input by the e-mail, the company code of the user, the user ID of the user are in correspondence with each other in the job attribute data storing unit 2117.

In step S113, the job analyzing unit 2112 of the print service application 211 requests the data processing unit 224 to store the input job in the data storage 235.

Then, in step S114, the data processing unit 224 stores the job in the data storage 235, and stores the job ID and a place where the job is stored in the data management data storing unit 234.
(Process of Inputting Job by Web Upload)

Figure 17:
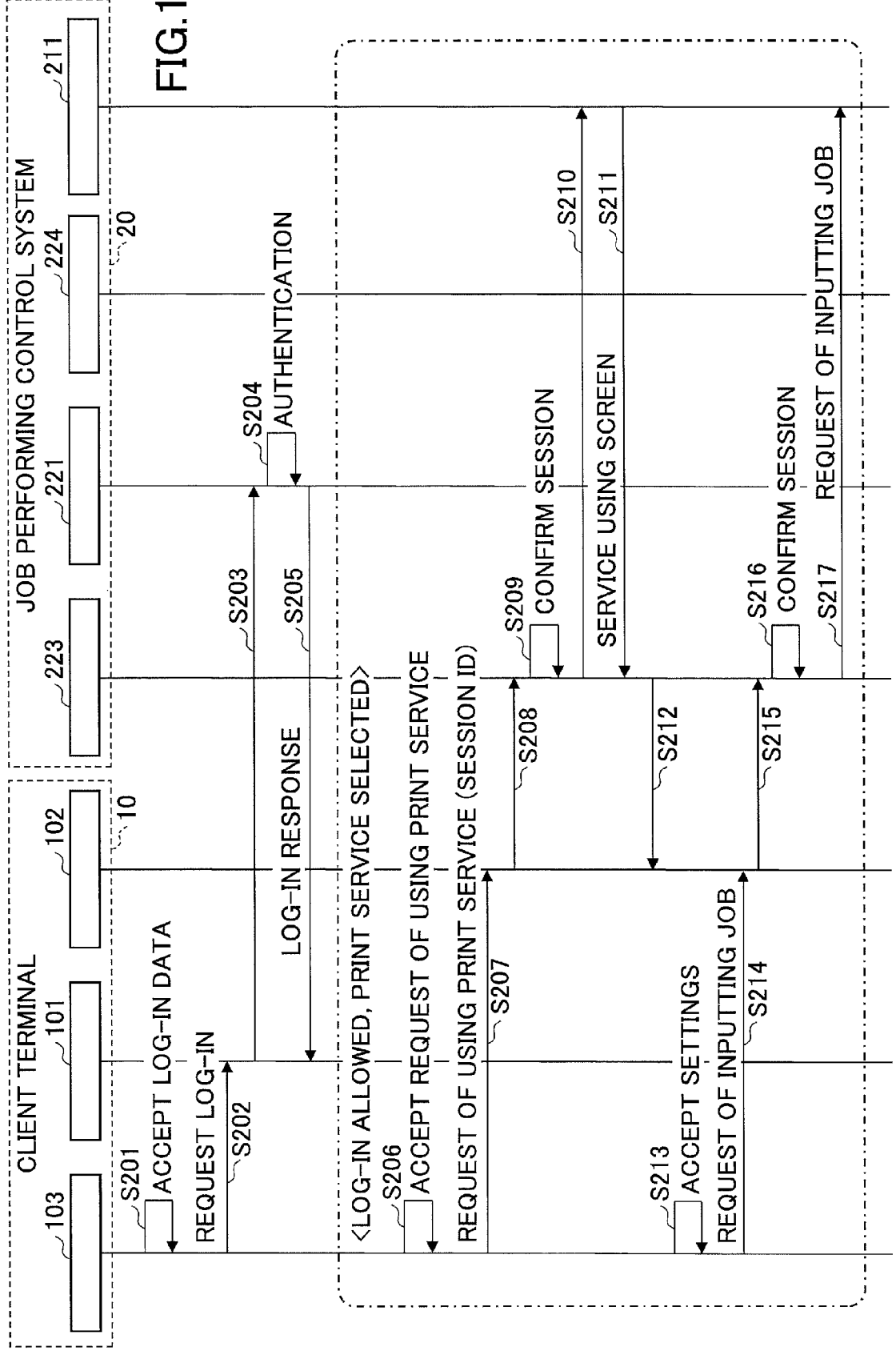
FIG. 17 is a sequence diagram illustrating an example of a process of inputting a job by a web upload of the embodiment.
Figure 18:
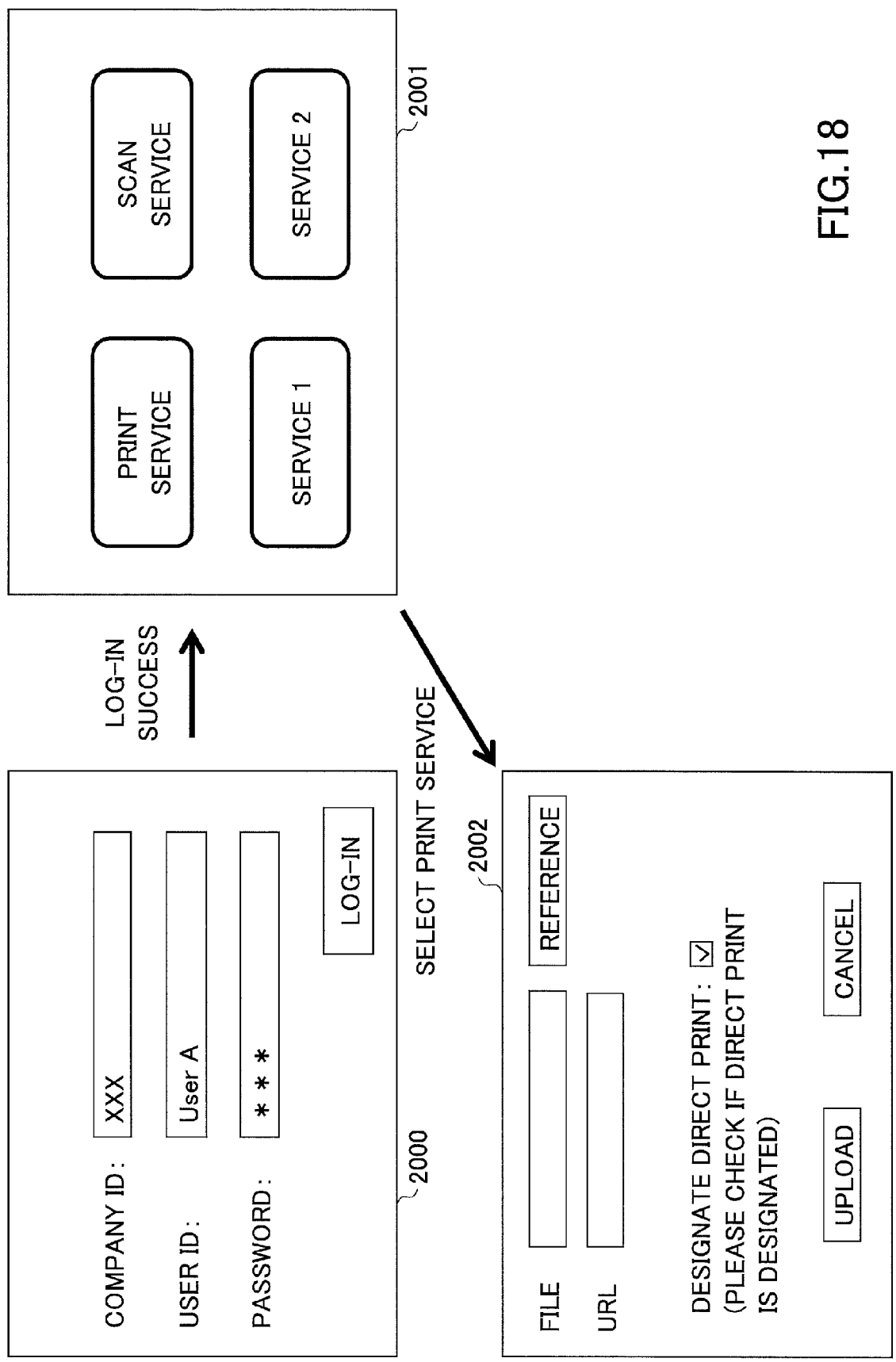
FIG. 18 is a view illustrating an example of a log-in screen and a screen after log-in displayed on the client terminal.

FIG. 17 is a sequence diagram illustrating an example of a process of inputting a job by web upload, instead of inputting the job by an e-mail as illustrated in FIG. 16, of the embodiment. As illustrated in FIG. 17, the job performing control system 20 may receive the job by web upload. FIG. 18 is a view illustrating an example of a log-in screen and a screen after log-in displayed on the client terminal 10.

The user (the person who instructs to input the job) requests a log-in to the job performing control system 20 by inputting the company ID, the user ID and the password and presses a log-in button in a log-in screen 2000 displayed on the client terminal 10, illustrated in FIG. 18. The company ID is an example of the company code.

Referring back to FIG. 17, in step S201, the input accepting unit 103 of the client terminal 10 accepts the company ID, the user ID and the password from the user as log-in data. In step S202, the input accepting unit 103 sends a log-in request accepted from the user to the log-in requesting unit 101. In step S203, the log-in requesting unit 101 requests the authentication processing unit 221 of the job performing control system 20 to log-in based on the log-in data accepted from the user.

In step S204, the authentication processing unit 221 authenticates the log-in data. The authentication processing unit 221 determines whether to allow or not to allow the log-in by the user. Here, it is assumed that the log-in by the user is allowed.

In step S205, the authentication processing unit 221 sends a log-in response indicating that the log-in allowed to the log-in requesting unit 101 of the client terminal 10. Upon receiving the log-in response indicating that the log-in allowed, the client terminal 10 displays a service selection screen 2001 as illustrated in FIG. 18, for example, to have the user select a service.

When the user presses a print service button in the service selection screen 2001, the print service is selected. In step S206, it is assumed that the input accepting unit 103 of the client terminal 10 accepts a request of using the print service from the user. In step S207, the input accepting unit 103 outputs the request of using the print service to the job inputting unit 102.

In step S208, the job inputting unit 102 sends the request of using the print service accepted from the user to the job performing control system 20. After confirming the session in step S209, the session management unit 223 obtains screen data of a print service screen 2002 as illustrated in FIG. 18 as an example of a service using screen from the print service application 211 in steps S210 to S211. The print service screen 2002 includes, designation forms for the job to input (upload), a check box to designate a direct print. The check box to designate the direct print is checked when the user wishes to have the input job to be performed by the direct print. The print service screen 2002 further includes an upload button and a cancel button. The print service screen 2002 may further include a setting format for setting the print property (color/monochrome, single side/both sides or the like).

Referring back to FIG. 17, in step S212, the session management unit 223 sends the screen data of the print service screen 2002 to the job inputting unit 102. The client terminal 10 displays the print service screen 2002 as illustrated in FIG. 18 and accepts a designation of the job to input from the user.

The user sets the data to be printed by designating a file, an URL or the like, sets data such as checking the check box to designate the direct print or the like, and presses the upload button in the print service screen 2002.

In step S213, the input accepting unit 103 of the client terminal 10 accepts settings of the data to be printed from the user. In step S214, the input accepting unit 103 outputs a request of inputting the job based on the settings of the data accepted from the user, to the job inputting unit 102. In step S215, the job inputting unit 102 sends the request of inputting the job to the job performing control system 20.

After confirming the session in step S216, in step S217, the session management unit 223 outputs the request of inputting the job to the print service application 211. Processes of the print service application 211 after receiving the request of inputting the job are the same as those of the case when the job is input by the e-mail except that the job attribute data is extracted based on the e-mail received from the user, or the job attribute data is extracted based on the settings of the data accepted from the user. Thus, the explanation is omitted.

(Process of Storing Job (Job Performing Control System))

Figure 19:
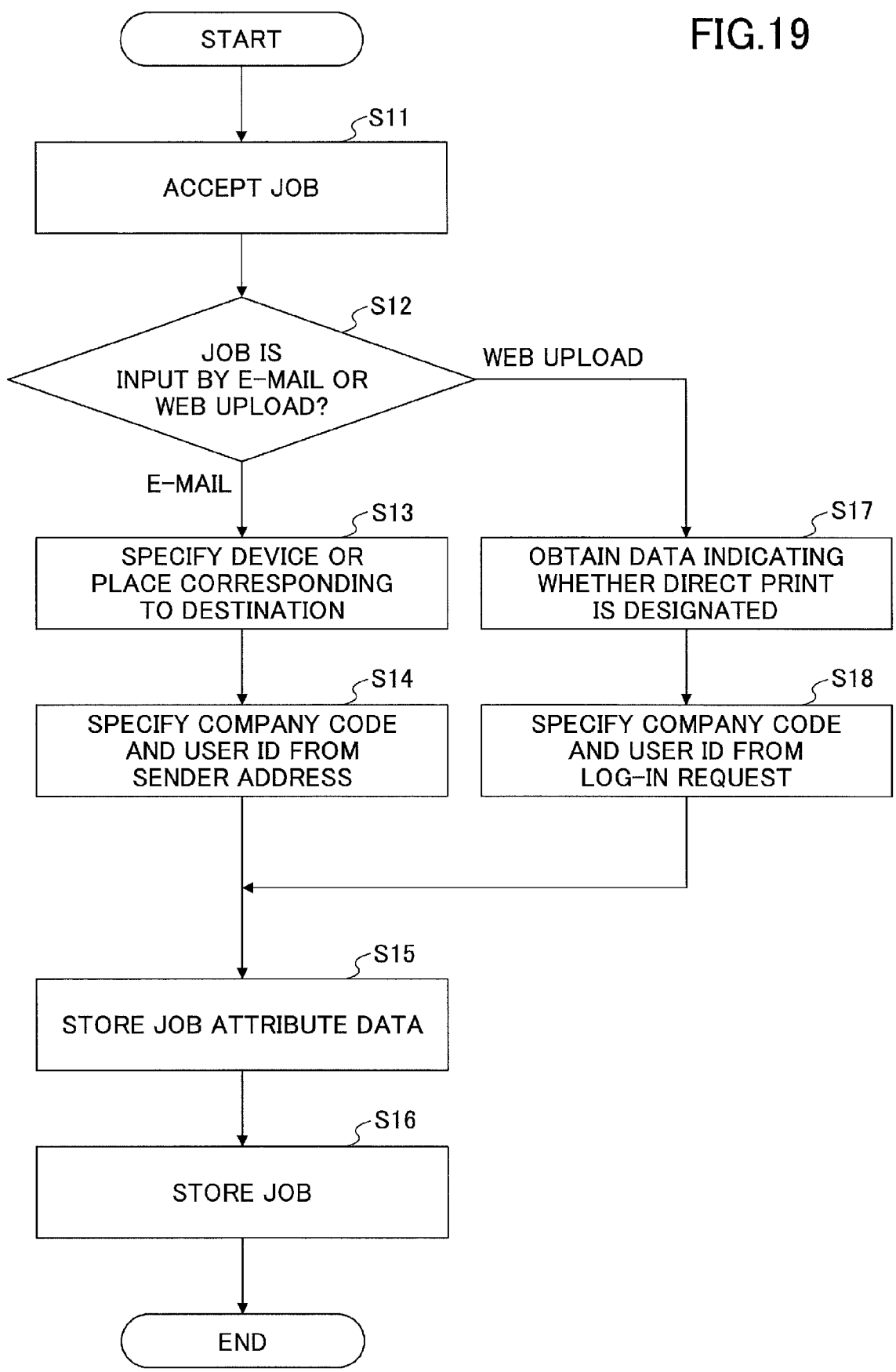
FIG. 19 is a flowchart illustrating an example of a process performed by the job performing control system of the embodiment after receiving a job.

FIG. 19 is a flowchart illustrating an example of a process performed by the job performing control system 20 of the embodiment after receiving the job. The process performed by the job performing control system 20 after receiving the job from the client terminal 10 is explained with reference to FIG. 19.

First, upon receiving the job from the mail obtaining unit 225 or the session management unit 223, the job accepting unit 2111 of the print service application 211 requests the job analyzing unit 2112 to analyze the received job (S11).

The job analyzing unit 2112 determines the method of inputting the job, that is, whether the job is input by the e-mail or the web upload (S12). Specifically, the job analyzing unit 2112 determines that the job is input by the e-mail when the job includes e-mail data and determines that the job is input by the web upload when the job includes the company code, the user ID and the device ID.

When it is determined that the job is input by the e-mail in step S12, the device or the office (place) corresponding to the destination address included in the job is specified (S13). Specifically, the job analyzing unit 2112 obtains the device ID or the provided office corresponding to the destination address included in the job from the device management data storing unit 233 (S13). Here, with reference to FIG. 14, when it is assumed that the destination address is "DEV111.A@xxx.com", for example, the device ID "DEV111" corresponding to the device/office address data "DEV111.A@xxx.com" is obtained. If there is no device ID corresponding to the "device/office address data", the office name set in the "provided office" is obtained.

Then, the job analyzing unit 2112 obtains the company ID and the user ID of the user (the person who inputs the job) from the user management data storing unit 232 based on the sender address included in the job (S14). Here, for example, when it is assumed that the sender address is "userA@xxx.com", the company code "XXX" and the user ID "UserA" corresponding to the user address data "userA@xxx.com" in the user management data storing unit 232 as illustrated in FIG. 13 are obtained.

Then, the job analyzing unit 2112 stores the specified "company code", the "user ID", the "job inputting method" and the "device/office address data", and the "job name" and the "print setting" included in the job in the job attribute data storing unit 2117 via the job attribute data management unit 2113 (S15).

Then, the job analyzing unit 2112 requests the data processing unit 224 to store the sent job in the data storage 235 and the data processing unit 224 stores (registers) the job in the data storage 235 (S16).

On the other hand, when it is determined that the job is sent by the web upload in step S12, the job analyzing unit 2112 obtains data indicating whether the direct print is designated included in the request of inputting the job (S17).

Next, the job analyzing unit 2112 obtains the company code and the user ID included in the log-in request (S18). Thereafter, the above described processes after step S15 are performed. Here, when the job is sent by the web upload, in step S15, the "job inputting method" included in the job attribute data is set to be "web upload", and when the direct print is designated, the "direct print designating flag" is set to be "ON". Further, in this case, values are not set in the "e-mail destination device/office data" (N/A or the like is set).

As described above, the job performing system 1 of the embodiment is capable of storing the job input from the client terminal 10 and the job attribute data of the job including the job inputting method in the job performing control system 20.

2. Process of Performing Job (Process of Performing Job)

Figure 20:
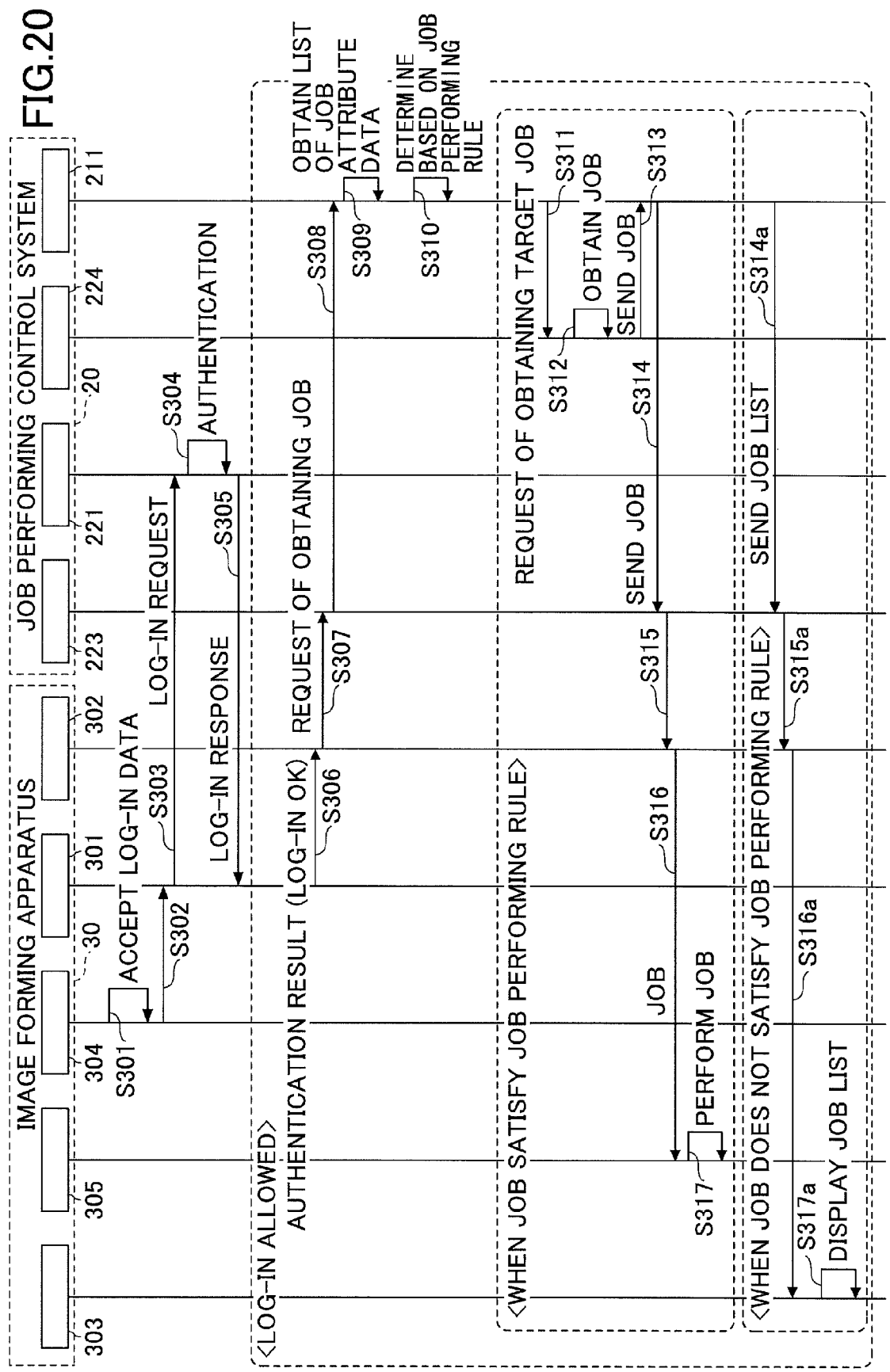
FIG. 20 is a sequence diagram illustrating an example of a process of performing a job of the embodiment.

Then, a process of having the image forming apparatus 30 perform the input job in accordance with an instruction by the user is explained. FIG. 20 is a sequence diagram illustrating an example of a process of performing a job of the embodiment.

First, upon receiving an input of the authentication data (log-in data) such as the company code, the user ID, the password or the like from the user (S301), the input accepting unit 304 of the image forming apparatus 30 requests the log-in to the log-in requesting unit 301 (S302). Here, the authentication data may be input using the IC card or the like on which the user ID or the like of the user is written.

The log-in requesting unit 301 sends the log-in request including the company code, the user ID and the password to the job performing control system 20 (S303).

The authentication processing unit 221 of the job performing control system 20 refers to the user management data storing unit 232 and performs an authentication process based on the company code, the user ID and the password included in the log-in request (S304). Then, the authentication processing unit 221 sends the authentication result as a log-in response to the image forming apparatus 30 (S305). Here, when the authentication result indicates success (log-in is allowed), the authentication processing unit 221 also sends a token (cookie) to the image forming apparatus 30. The job performing control system 20 stores the token and the user name and the company code of the authenticated user in correspondence with each other.

Processes after step S306 are examples when the authentication result is success (log-in OK). The log-in requesting unit 301 outputs the authentication result (log-in OK) including the received token to the job obtaining unit 302 (S305). The job obtaining unit 302 generates a request of obtaining a job including the token and the device ID of the image forming apparatus 30 for obtaining a job corresponding to the logged-in user (user ID) from the job performing control system 20 and sends it to the job performing control system 20 (S307).

Upon receiving the request of obtaining the job, the session management unit 223 of the job performing control system 20 determines whether the same token as the token included in the request of obtaining the job exists in previously stored tokens. When the same token as the token included in the request of obtaining the job exists in the previously stored tokens, the session management unit 223 adds the user ID and the company code that are corresponded with the token to the request of obtaining the job and outputs the request of obtaining the job to the print service application 221 (S308).

Upon receiving the request of obtaining the job, the job/job list sending unit 2114 of the print service application 221 outputs the company code and the user ID included in the request of obtaining the job to the determining unit 2115. The determining unit 2115 obtains a list of the job attribute data of the job stored in the job attribute data storing unit 2117 that match the user ID and the company code included in the request of obtaining the job via the job attribute data management unit 2113 (S309). Then, the determining unit 2115 determines whether each of the jobs satisfies the job performing rule based on the read out job attribute data and the job performing rule stored in the job performing rule data storing unit 2118 (S310). The jobs determined to satisfy the job performing rule by the determining unit 2115 are target jobs for the direct print. On the other hand, the jobs determined not to satisfy the job performing rule by the determining unit 2115 are target jobs for the normal on-demand printing. The determining unit 2115 outputs a determined result to the job/job list sending unit 2114.

Here, when the job is determined to satisfy the job performing rule by the determining unit 2115 in step S310, the job/job list sending unit 2114 sends a request of obtaining a target job for the direct print to the data processing unit 224. Upon receiving the target job from the data storage 235 (S312), the data processing unit 224 sends a response including the obtained job to the job/job list sending unit 2114 (S313). The job/job list sending unit 2114 sends the obtained job to the image forming apparatus 30 via the session management unit 223 (S314, S315).

The job obtaining unit 302 of the image forming apparatus 30 requests the job performing unit 305 to perform the obtained job (S316). The job performing unit 305 performs (prints) the job (S317).

On the other hand, when it is determined that the job does not satisfy the job performing rule by the determining unit 2115 in step S310, the job/job list sending unit 2114 sends the job list of the job(s) that does not satisfy the job performing rule to the image forming apparatus 30 (S315a) via the session management unit 223 (S314a).

The job obtaining unit 302 of the image forming apparatus 30 requests the display control unit 303 to display the obtained job list (S316a). The display control unit 303 displays the job list on the operation panel 302, an external display that is connected to the display control unit 303 or the like (S317a).

Here, when the jobs in the job list corresponding to the user include both of a job that satisfies the job performing rule and a job(s) that does not satisfy the job performing rule, the job and the job list may be sent from the job performing control system 20 to the image forming apparatus 30.

(Process of Receiving Request of Obtaining Job (Job Performing Control System))

Figure 21:
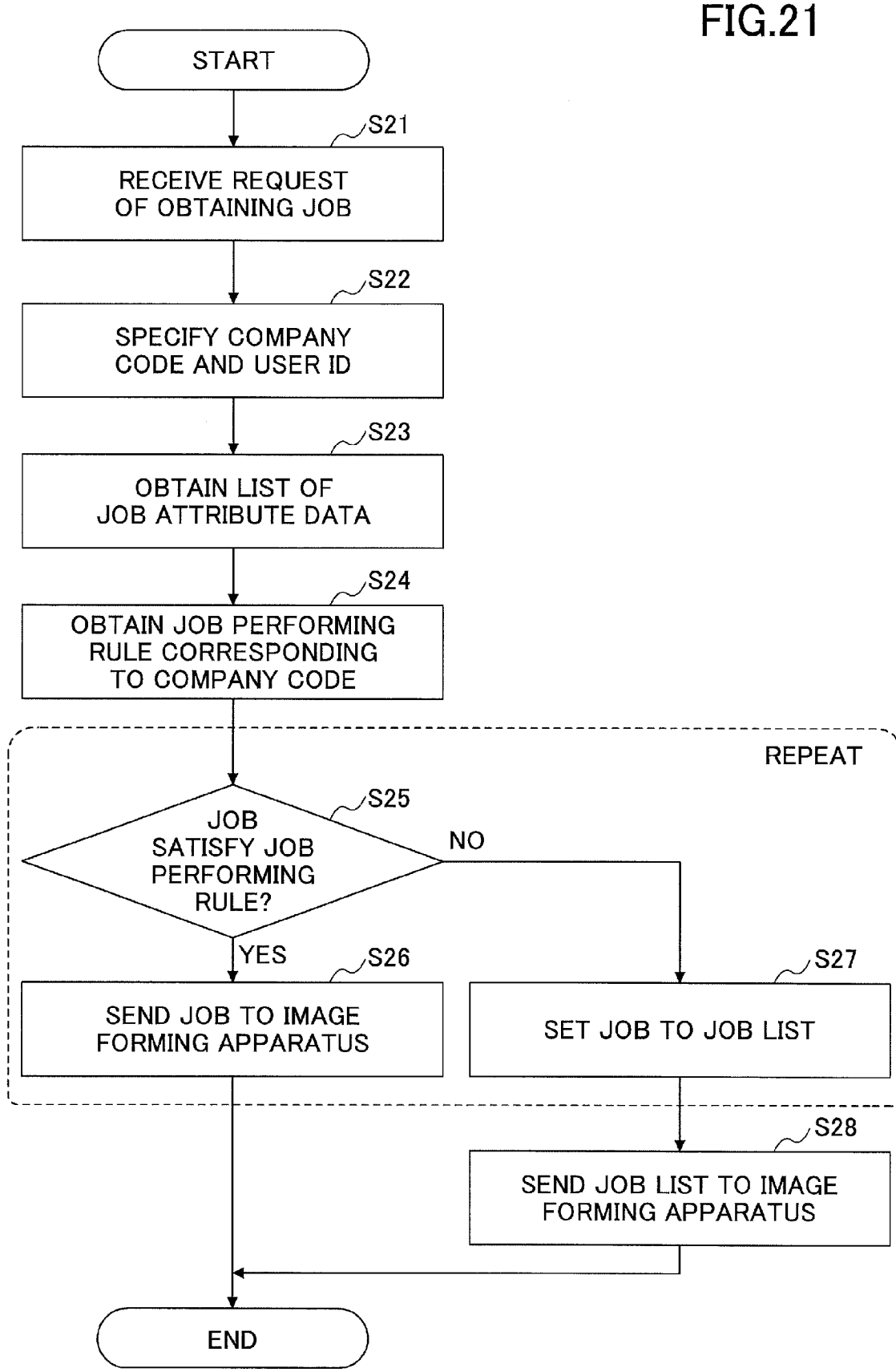
FIG. 21 is a flowchart illustrating an example of a process performed by the job performing control system of the embodiment after receiving a request of obtaining a job.

FIG. 21 is a flowchart illustrating an example of a process performed by the job performing control system 20 of the embodiment after receiving a request of obtaining a job. The process by the job performing control system 20 after receiving the request of obtaining the job from the image forming apparatus 30 (processes after step S308 in FIG. 20) is explained with reference to FIG. 21.

First, the job/job list sending unit 2114 of the print service application 211 of the job performing control system 20 receives the request of obtaining the job sent from the image forming apparatus 30 (S21). Then, the job/job list sending unit 2114 extracts the user ID and the company code included in the request of obtaining the job (S22). The job/job list sending unit 2114 outputs the extracted user ID and the company code to the determining unit 2115.

The determining unit 2115 obtains a list of job attribute data corresponding to the user ID from the job attribute data storing unit 2117 via the job attribute data management unit 2113 (S23).

Next, the determining unit 2115 obtains the job performing rule corresponding to the company code from the job performing rule data storing unit 2118 via the job performing rule management unit 2116 (S24).

Processes of steps S25 to S27 are performed for each of the jobs included in the list of the job attribute data.

The determining unit 2115 determines whether the job attribute data of the job included in the list of the job attribute data satisfies the job performing rule, in other words, the condition to allow the direct print (S25). The process of determining is explained in detail later with reference to FIG. 22.

When the target job is determined to satisfy the job performing rule (YES in step S25), the job/job list sending unit 2114 obtains the target job from the data storage 235 via the data processing unit 224, and sends it to the image forming apparatus 30 (S26).

On the other hand, when the target job is determined not to satisfy the job performing rule (NO in step S25), the determining unit 2115 sets the target job in the job list (S27). Then, after the determining process is performed for the number of the jobs included in the job attribute data list, the job/job list sending unit 2114 sends the job list to the image forming apparatus 30 (S28).

Here, the job that satisfies the job performing rule in step S26 may be sent every time the process of determining is performed, or may be sent at the same time with other jobs that satisfy the job performing rule after the process of determining for all of the jobs included in the list of the job attribute data are performed. Further, the process of step S26 in which the job is sent and the process of step S28 in which the job list is sent may be performed at the same time.

(Process of Determining (Job Performing Control System))

Figure 22:
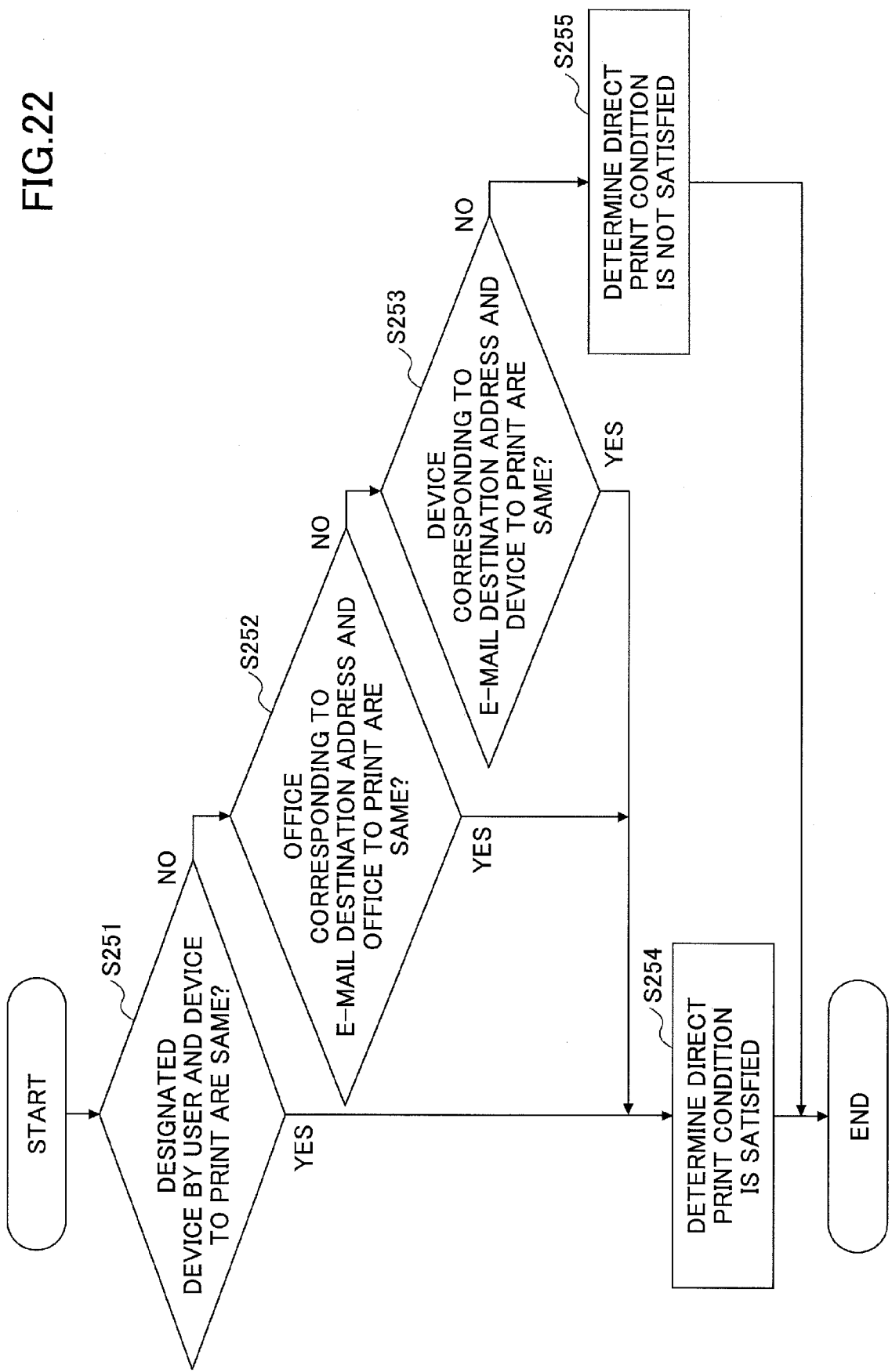
FIG. 22 is a flowchart illustrating an example of a determining process of the job performing control system of the embodiment.

FIG. 22 is a flowchart illustrating an example of a process of determining by the job performing control system 20 of the embodiment. Next, the process of determining (step S25 in FIG. 21) performed by the determining unit 2115 of the print service application 211 is explained with a specific example.

Here, in FIG. 22, for example, it is assumed that the user ID of the user is "UserA", the company code is "XXX", and the device ID of the image forming apparatus 30 to which the user logs-in to have a printed document is "DEV222". Further, it is assumed that data as illustrated in FIG. 13, FIG. 9 and FIG. 11 are stored in the user management data storing unit 232, the job attribute data storing unit 2117 and the job performing rule data storing unit 2118, respectively.

The determining unit 2115 reads out the job attribute data of the job IDs "1", "3" and "4" corresponding to the user ID "UserA" and the company code "XXX" from the job attribute data storing unit 2117 (see FIG. 9). First, the determining unit 2115 designates the job corresponding to the job ID "1", among the job IDs "1", "3" and "4" as a target job.

Further, the determining unit 2115 reads out the job performing rule based on the user ID "UserA" and the company code "XXX" from the job performing rule data storing unit 2118 (see FIG. 11).

Then, the determining unit 2115 determines whether one of the job performing rules illustrated in FIG. 11, for example, "designated device by user and device to print are same", is satisfied (S251). Here, as the designated device ID of the user ID "UserA" is "DEV111" according to the user management data storing unit 232 (see FIG. 13), it is determined that the designated device by the user and the device to print ("DEV222") are different (NO in step S251).

Next, the determining unit 2115 determines whether another one of the job performing rules illustrated in FIG. 11 "office corresponding to e-mail destination address and office to print are same" is satisfied (S252). Here, as the e-mail destination device/office data included in the job attribute data corresponding to the job ID "1" is "DEV222" as illustrated in FIG. 9, address data corresponding to an office is not set as the e-mail destination address. Thus, it is determined that the "office corresponding to e-mail destination address and office to print are same" is not satisfied (NO in step S252).

Next, the determining unit 2115 determines whether another one of the job performing rules illustrated in FIG. 11 "device corresponding to e-mail destination address and device to print are same" is satisfied (S253). Here, as the e-mail destination device/office data included in the job attribute data corresponding to the job ID "1" is "DEV222" as illustrated in FIG. 9, and the device to print is also "DEV222", it is determined that the "device corresponding to e-mail destination address and device to print are same" is satisfied (YES in step S253).

In this case (YES in step S253), the job (job ID "1") is determined to satisfy the condition for the direct print (job performing rule) (S254). Similarly, when the job is determined to satisfy any one of the job performing rules (YES in step S251 or S252), the job is determined to satisfy the condition for the direct print (S254).

On the other hand, when the job is determined not to satisfy all of the job performing rules corresponding to the company code "XXX" (NO in step S253), the job is determined not to satisfy the condition for the direct print (job performing rule) (S255).

The process of determining illustrated in FIG. 22 is performed for all of the jobs (job ID "1", "3" and "4") corresponding to the user ID "UserA" and the company code "XXX".

Here, the process of determining based on the job performing rule may not be performed by the job performing control system 20 (print service application 211). Alternatively, the process of determining may be performed by the image forming apparatus 30, not by the job performing control system 20, for example. In this case, for example, the image forming apparatus 30 may include a unit that has the same function as the determining unit 2115 and the data stored in the job attribute data storing unit 2117 and the job performing rule data storing unit 2118 may be included in a response to the request of obtaining the job from the image forming apparatus 30. Then, the image forming apparatus 30 may perform the process of determining.

By the above processes, according to the job performing system 1 of the embodiment, whether to perform the direct print is determined based on the predetermined job performing rule previously set by the administrator or the like and the job attribute data of the job set based on the method of inputting the job (e-mail, web upload, or the like) or the like. Then, in the job performing system 1 of the embodiment, when the input job is determined to satisfy the predetermined job performing rule and the input job is determined to be performed by the direct print by the job performing control system 20, the job is obtained from the job performing control system 20 to be printed when a user logs-in from the image forming apparatus 30, without having the user select a job from a job list.

With this, the administrator or the user is capable of flexibly changing the method of performing the job based on the method of inputting the job, the device (image forming apparatus 30) to use or the like so that the procedure for printing can be simplified.

Further, as the direct print is performed after the user logs-in the image forming apparatus 30 that performs the job, the user can be prevented from leaving the printed document that causes leakage of the content to a third person. Thus, security can be improved compared with the device designated printing by which the job is immediately printed right after the job is input.

According to the embodiment, a technique capable of easily controlling a method of performing the job based on a method of inputting the job is provided.

Although a preferred embodiment of the job performing control system, the job performing system and the job performing control method has been specifically illustrated and described, it is to be understood that minor modifications may be made therein without departing from the spirit and scope of the invention as defined by the claims.

For example, the image forming apparatus 30 is exemplified as an example of the job performing apparatus, the job performing apparatus is not limited to the image forming apparatus 30, and may be any apparatuses that perform a job such as a projection apparatus like a projector or the like, a display apparatus that displays image data, or the like. Further, the structure of the job performing control system 20 is not limited to that illustrated in FIG. 1, and may be an apparatus that controls a job performing apparatus to perform the job or a system of a combination of a plurality of such apparatuses.

The individual constituents of the job performing system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The present application is based on and claims the benefit of priority of Japanese Priority Application No. 2013-038764 filed on Feb. 28, 2013, the entire contents of which are hereby incorporated by reference.

What is claimed is:

1. A job performing control system that includes at least an apparatus and controls a job performing apparatus that performs a job, comprising:

a job storing unit that stores a job input in the job performing control system with attribute data of the job, the attribute data being set based on an inputting method of the job;

a rule storing unit that stores a predetermined condition that allows a method of performing the job in the job performing apparatus by which the job stored in the job storing unit is performed without selecting a job to be performed from a job list on a screen of the job performing apparatus, upon a log-in by a user in the job performing apparatus;

a determining unit that determines whether the attribute data of the job satisfies the predetermined condition; and a performing control unit that controls the job performing apparatus to perform the job determined to satisfy the predetermined condition by the determining unit by the method of performing the job before displaying the job list on the screen when the job satisfying the predetermined condition exists in the job list, and display the job list on the screen without performing the method of performing the job when the job satisfying the predetermined condition does not exist in the job list.

2. The job performing control system according to claim 1, wherein the performing control unit controls to display the job list of a job that is determined not to satisfy the predetermined condition by the determining unit on the screen after performing the job that is determined to satisfy the predetermined condition by the determining unit by the method of performing the job.

3. The job performing control system according to claim 2, wherein the performing control unit sends the job list of the job that is determined not to satisfy the predetermined condition by the determining unit with the job that is determined to satisfy the predetermined condition by the determining unit, to the job performing apparatus when the job satisfying the predetermined condition exists in a job list associated with the user.

4. The job performing control system according to claim 1, wherein the job storing unit stores the job in correspondence with user identification data that identifies a user who inputs the job, and wherein the determining unit determines, upon accepting a request of obtaining a job including the user identification data from the job performing apparatus, whether the attribute data of the job that is in correspondence with user identification data same as the accepted user identification data satisfies the predetermined condition.

5. The job performing control system according to claim 1, further comprising:

an analyzing unit that analyzes the job input in the job performing control system and sets attribute data of the job.

6. The job performing control system according to claim 5, wherein, when the job is input by an e-mail, the analyzing unit specifies the user who inputs the job based on sender address data of the e-mail, and wherein the job storing unit stores the job in correspondence with user identification data of the specified user.

7. The job performing control system according to claim 5, further comprising:

a job performing place data storing unit that stores address data of an e-mail and a place to perform a job in correspondence with each other, wherein, when the job is input by an e-mail, the analyzing unit specifies the place to perform the job based on destination address data of the e-mail, and wherein the determining unit determines whether the attribute data of the job satisfies the predetermined condition based on a fact whether the job performing apparatus that sends a request of obtaining a job is included in the place.

8. A job performing system comprising:

a job performing apparatus that performs a job; and a job performing control system that includes at least an apparatus and controls the job performing apparatus, wherein the job performing control system includes a job storing unit that stores a job input in the job performing control system with attribute data of the job, the attribute data being set based on an inputting method of the job, a rule storing unit that stores a predetermined condition that allows a method of performing the job in the job performing apparatus by which the job stored in the job storing unit is performed without selecting a job to be performed from a job list on a screen of the job performing apparatus, upon a log-in by a user in the job performing apparatus, a determining unit that determines whether the attribute data of the job satisfies the predetermined condition, and a performing control unit that controls the job performing apparatus to perform the job determined to satisfy the predetermined condition by the determining unit by the method of performing the job before displaying the job list on the screen when the job satisfying the predetermined condition exists in the job list, and display the job list on the screen without performing the method of performing the job when the job satisfying the predetermined condition does not exist in the job list, and the job performing apparatus includes a job performing unit that performs the job based on the method of performing.

9. A job performing control method performed by a job performing control system that includes at least an apparatus and controls a job performing apparatus that performs a job, comprising:

a job storing step of storing a job input in the job performing control system with attribute data of the job, the attribute data being set based on an inputting method of the job;

a rule storing step of storing a predetermined condition that allows a method of performing the job in the job performing apparatus by which the job stored in the job storing step is performed without selecting a job to be performed from a job list on a screen of the job performing apparatus, upon a log-in by a user in the job performing apparatus;

a determining step of determining whether the attribute data of the job satisfies the predetermined condition; and a performing control step of controlling the job performing apparatus to perform the job determined to satisfy the predetermined condition in the determining step by the method of performing the job before displaying the job list on the screen when the job satisfying the predetermined condition exists in the job list, and display the job list on the screen without performing the method of performing the job when the job satisfying the predetermined condition does not exist in the job list.

10. The job performing control method according to claim 9,
wherein in the performing control step, the job list of a job that is determined not to satisfy the predetermined condition in the determining step is controlled to be displayed on the screen after performing the job that is determined to satisfy the predetermined condition in the determining step by the method of performing the job.

11. The job performing control method according to claim 10,
wherein in the performing control step, the job list of the job that is determined not to satisfy the predetermined condition in the determining step is sent with the job that is determined to satisfy the predetermined condition in the determining step, to the job performing apparatus when the job satisfying the predetermined condition exists in a job list associated with the user.

12. The job performing control method according to claim 9,
wherein in the job storing step, the job is stored in correspondence with user identification data that identifies a user who inputs the job, and
wherein in the determining step, upon accepting a request of obtaining a job including the user identification data from the job performing apparatus, whether the attribute data of the job that is in correspondence with user identification data same as the accepted user identification data, satisfies the predetermined condition is determined.

13. The job performing control method according to claim 9, further comprising:
an analyzing step of analyzing the job input in the job performing control system and setting attribute data of the job.

14. The job performing control method according to claim 13,
wherein, when the job is input by an e-mail, in the analyzing step, the user who inputs the job is specified based on sender address data of the e-mail, and
wherein in the storing step, the job is stored in correspondence with user identification data of the specified user.

15. The job performing control method according to claim 13, further comprising:
a job performing place data storing step of storing address data of an e-mail and a place to perform a job in correspondence with each other,
wherein, when the job is input by an e-mail, in the analyzing step, the place to perform the job is specified based on destination address data of the e-mail, and
in the determining step, whether the attribute data of the job satisfies the predetermined condition is determined based on a fact whether the job performing apparatus that sends a request of obtaining a job is included in the place.

16. The job performing control system according to claim 1,
wherein the attribute data of the job includes the inputting method of the job, and
wherein the predetermined condition stored in the rule storing unit includes a condition regarding an inputting method of a job for which the method of performing the job is allowed.

17. The job performing control system according to claim 1,
wherein the attribute data of the job includes data indicating a job performing apparatus designated as a destination of an e-mail or an office name corresponding to the destination of the e-mail when the job is input by the e-mail, and
wherein the predetermined condition stored in the rule storing unit includes a condition regarding a job performing apparatus or an office for which the method of performing the job is allowed.

\* \* \* \* \*